(12) United States Patent
Fisher et al.

(10) Patent No.: US 8,019,793 B2
(45) Date of Patent: Sep. 13, 2011

(54) METHODOLOGY INFRASTRUCTURE AND DELIVERY VEHICLE

(75) Inventors: Christopher M. Fisher, River Forest, IL (US); Hollis H. Moore, Evanston, IL (US); Edy S. Cosillo, Wheaton, IL (US); Barry K. Law, Lexington, MA (US)

(73) Assignee: Accenture Global Services Limited, Dublin (IE)

( * ) Notice: Subject to any disclaimer, the term of this patent is extended or adjusted under 35 U.S.C. 154(b) by 1624 days.

(21) Appl. No.: 10/367,618

(22) Filed: Feb. 14, 2003

(65) Prior Publication Data

US 2004/0162849 A1  Aug. 19, 2004

(51) Int. Cl.
*G06F 7/00* (2006.01)
*G06F 17/30* (2006.01)

(52) U.S. Cl. ...................................... 707/803
(58) Field of Classification Search ............. None
See application file for complete search history.

(56) References Cited

U.S. PATENT DOCUMENTS

| | | | |
|---|---|---|---|
| 6,886,007 B2 | 4/2005 | Leymann et al. | |
| 7,039,898 B2* | 5/2006 | Shah | 717/107 |
| 7,047,318 B1* | 5/2006 | Svedloff | 709/246 |
| 2002/0026297 A1 | 2/2002 | Leymann et al. | |
| 2002/0133484 A1* | 9/2002 | Chau et al. | 707/3 |
| 2002/0133516 A1* | 9/2002 | Davis et al. | 707/513 |
| 2004/0044637 A1* | 3/2004 | Vachuska et al. | 707/1 |
| 2004/0064803 A1* | 4/2004 | Graves et al. | 717/104 |
| 2006/0010425 A1* | 1/2006 | Willadsen et al. | 717/120 |

FOREIGN PATENT DOCUMENTS

| | | |
|---|---|---|
| EP | 1 122 652 A1 | 8/2001 |
| EP | 1 122 652 A2 | 8/2001 |
| WO | WO 02/088944 A1 | 11/2002 |

OTHER PUBLICATIONS

Delen, Dursun, et al., "An Integrated Toolkit for Enterprise Modeling and Analysis," *Proceedings of the 1999 Winter Simulation Conference*, pp. 289-297 (1999).
Hofmann, Andreas, "Development of a Library for Reusable Workflow Objects," ACM SIGGROUP Bulletin, vol. 18, No. 1, pp. 18-23 (Apr. 1997).
Vitharana, Padmal, et al., "Knowledge-Based Repository Scheme for Storing and Retrieving Business Components: A Theoretical Design and an Empirical Analysis," *IEEE Transactions on Software Engineering*, vol. 29, No. 7, pp. 649-664 (Jul. 2003).
Bergstrom, Scott, "Reusability Analysis of Reusable Objects" *AICC Management and Processes Subcommittee*, pp. 1-38 (2003).
Breunese, A.P.J., et al., "Libraries of Reusable Models: Theory and Application," *Simulation*, vol. 71, No. 1, pp. 1-12 (1998).
Schmidt, Marc-Thomas, "Building Workflow Business Objects," *OOPSLA '98 Business Object Workshop IV*, pp. 1-12 (1998).

(Continued)

*Primary Examiner* — Kavita Padmanabhan
(74) *Attorney, Agent, or Firm* — Brinks Hofer Gilson & Lione

(57) ABSTRACT

An infrastructure to develop, store, maintain and deliver methodology content to end users includes a database of metadata containing definitions of explicit and implicit relationships between methodology objects representative of published documents. The infrastructure includes an integrated suite of tools including a methodology development tool, multiple user interfaces including a methodology finder and a methodology browser, and an estimating tool that integrates the methodology content into the project planning process.

26 Claims, 13 Drawing Sheets

OTHER PUBLICATIONS

Schmid, Hans Albrecht, et al., "Business Procedures are not Represented Adequately in Business Applications and Frameworks!," *OOPSLA '98 Business Object Workshop IV*, pp. 1-4 (1998).

Manolescu, Dragos, "Workflow Enactment with Continuation and Future Objects," *Proceedings on the 17th ACM Sigplan Conference on Object-Oriented Programming, Systems, Languages, and Applications*, pp. 40-51 (2002).

International Search Report dated Dec. 15, 2004, for corresponding international application PCT/EP2004/001500.

International Search Report dated Jan. 26, 2005, for international application PCT/EP2004/008716.

Dursun Delen et al.; "*An Integrated Toolkit for Enterprise Modeling and Analysis*"; Knowledge Based Systems, Inc. (KBSI), College Station, TX 77840, (USA); Proceedings of the 1999 Winter Simulation Conference, P.A. Farrington, H.B. Nembhard, D.T. Sturrock, and G.W. Evans, eds.; pp. 289-297.

Examination Report dated May 6, 2008 for European Patent Application No. 04710867.5.

Examiner's Second Report dated Nov. 2, 2010 for corresponding Australian Patent Application No. 2004263985.

Examiner's First Report dated Oct. 7, 2010 for corresponding Canadian Patent Application No. 2,534,666.

Vitharana et al., "Knowledge-Based Repository Scheme for Storing and Retrieving Business Components: A Theoretical Design and an Empirical Analysis," IEEE Transactions on Software Engineering, vol. 29, No. 7, Jul. 2003, pp. 649-664, ISSN: 0098-5589.

Delen et al., "An Integrated Toolkit for Enterprise Modeling and Analysis," Dec. 5, 1999, Winter Simulation Conference Proceedings, 1999, Phoenix, Arizona, USA, Piscataway, NJ, IEEE, pp. 289-297, ISBN: 0-7803-5780-9.

Breunese et al., "Libraries of Reusable Models: Theory and Application," Simulation, vol. 71, No. 1, 1998, ISSN: 0037-5497.

European Patent Office "Decision to Refuse a European Patent Application" dated Feb. 22, 2011 for corresponding European Patent Office Application No. 04 710 867.5.

\* cited by examiner

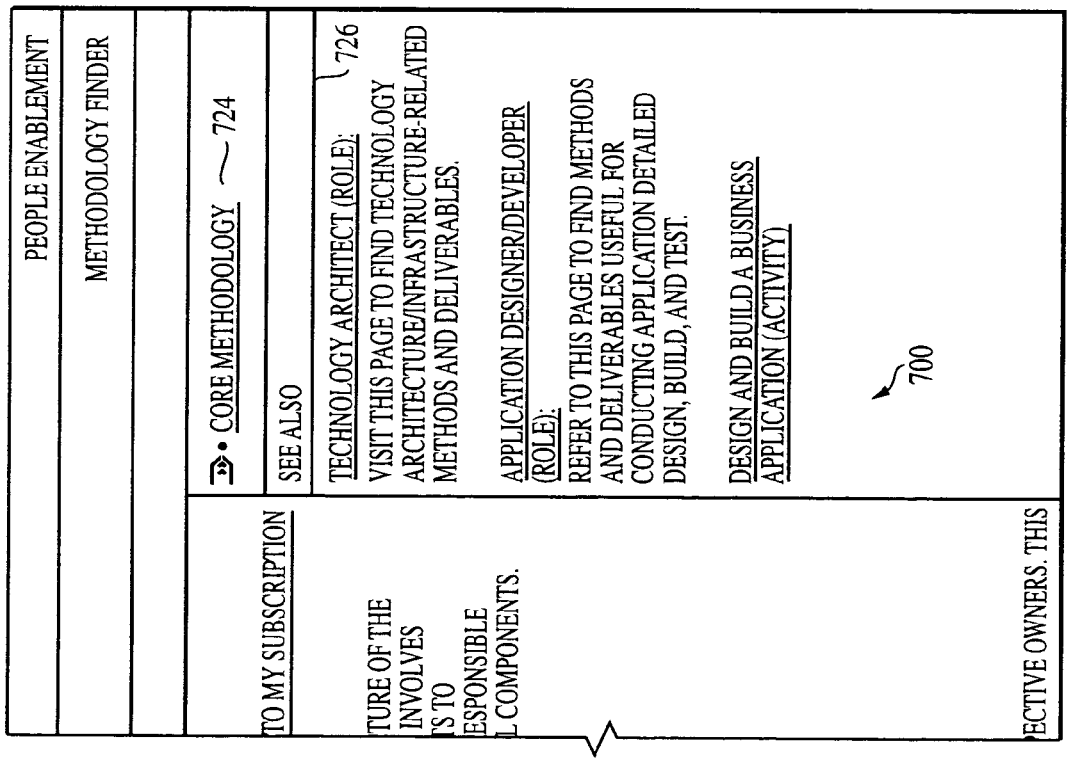

METHODOLOGY INFRASTRUCTURE AND DELIVERY VEHICLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawings hereto: Copyright © 2003, Accenture, All Rights Reserved.

BACKGROUND

1. Technical Field

The present invention relates generally to web publishing. The invention may find particular use in web publishing systems that involve highly integrated data containing a high volume of documents with numerous cross-referenced links between the documents. The present invention also relates to the generation of work planning documents.

2. Background Information

A methodology is a collection of information that explains how to plan, mobilize and execute a certain type of work. In other words, a methodology is a specific way of performing a multi-stage operation that implies precise deliverables and/or outcomes at the end of each stage. Deliverables are measurable results or outputs of a process. Thus, a methodology defines types of work processes in terms of measurable results. A well-defined methodology generally defines a business organization's best practices for accomplishing a given task and incorporates that organization's terminology. In this way, employees are able to integrate these best practices into their day-to-day handling of tasks. In order to take full advantage of this wealth of knowledge, methodologies must be accessible to various levels of employees throughout the organization. Publishing methodologies on an organization's intranet or securely on the Internet makes the methodologies instantly accessible to potentially any authorized individual throughout the world.

Four technical problems are generally encountered when defining and using a methodology across an organization. First, finding the appropriate content in a methodology using conventional browser interfaces is often difficult. Typically, methodologies are displayed in a manner that is generic and broadly-applicable, making it hard to locate the specific information that supports a given context. Second, traditional methods for accessing and displaying methodologies are inflexible. When information in the methodology needs updating, the process is often long and painful. Third, the data representative of highly integrated methodologies are difficult to maintain as a result of the high volume of explicit and implied relationships that exist among methodology data objects. Finally, it is often difficult to transform or share a methodology's content as an integral part of the project estimating and planning data and processes. The present invention solves these technical problems by providing a new paradigm for storing, maintaining, delivering and transforming the data representative of the methodology.

BRIEF SUMMARY

In one aspect, the invention includes a method for populating a database for use in storing data representative of a methodology. The method comprises (i) providing information files describing an object having a type, an object property and an object explicit relationship; (ii) providing rule files describing a relation between two object types, each relation having a relation property and an explicit relationship definition; (iii) generating at least one Structured Query Language (SQL) command representative of an implicit relationship based on an explicit relationship definition; and (iv) executing at least one generated SQL command on a database.

In a second aspect, the invention is a method for publishing documents containing hypertext links to other documents according to defined relationships. The method comprises: (i) preparing information files formatted in XML, with each file representative of an object having an object property and an object explicit relationship; (ii) providing a plurality of rule files formatted in XML describing a relation between at least two objects, each relation having a relation property and an explicit relationship definition; (iii) generating at least one implicit relationship based on at least one of the explicit relationship definitions for relating at least two of the object properties; (iv) applying a rules engine to generate a SQL command representative of one of the object explicit relationships, explicit relationship definitions, or the implicit relationships; and (v) generating a document by populating a presentation template with the object properties identified in the information files and with at least one link to another document, the link being defined by executing the generated SQL command.

In a third aspect, the invention is a method for providing multiple user-interface access to a methodology comprising: (i) publishing data describing a standardized set of tasks for the methodology in a methodology standards knowledge management repository; (ii) storing standardized project information for the methodology containing hypertext link definitions between the published data; (iii) locating a relevant methodology using a first browser interface; (iv) locating relevant documents within that methodology using a second browser interface accessible for temporally browsing within one methodology; (v) presenting selected documents containing methodology tasks, said selected documents containing links in accordance with the hypertext link definitions to associated data describing other methodology objects such as tasks, inputs and deliverables; (vi) downloading the standardized project information from the knowledge repository related to the selected document; and (vii) generating a project estimate by inputting project estimating parameters and selecting tasks listed in the standardized project information to define a project scope having displayable hypertext links to the in-scope selected tasks.

In a fourth aspect, the invention includes a computer system having a computer program embodied on a computer readable medium for populating a database for use in storing data representative of a methodology. The computer program comprises (i) a code segment for retrieving information files describing an object having a type, an object property and an object explicit relationship; (ii) a code segment for retrieving rule files describing a relation between two object types, each relation having a relation property and an explicit relationship definition; (iii) a code segment for generating at least one Structured Query Language (SQL) command representative of an implicit relationship based on an explicit relationship definition; and (iv) a code segment for executing at least one generated SQL command on a database.

DETAILED DESCRIPTION OF THE DRAWINGS AND THE PRESENTLY PREFERRED EMBODIMENTS

Figure 1:
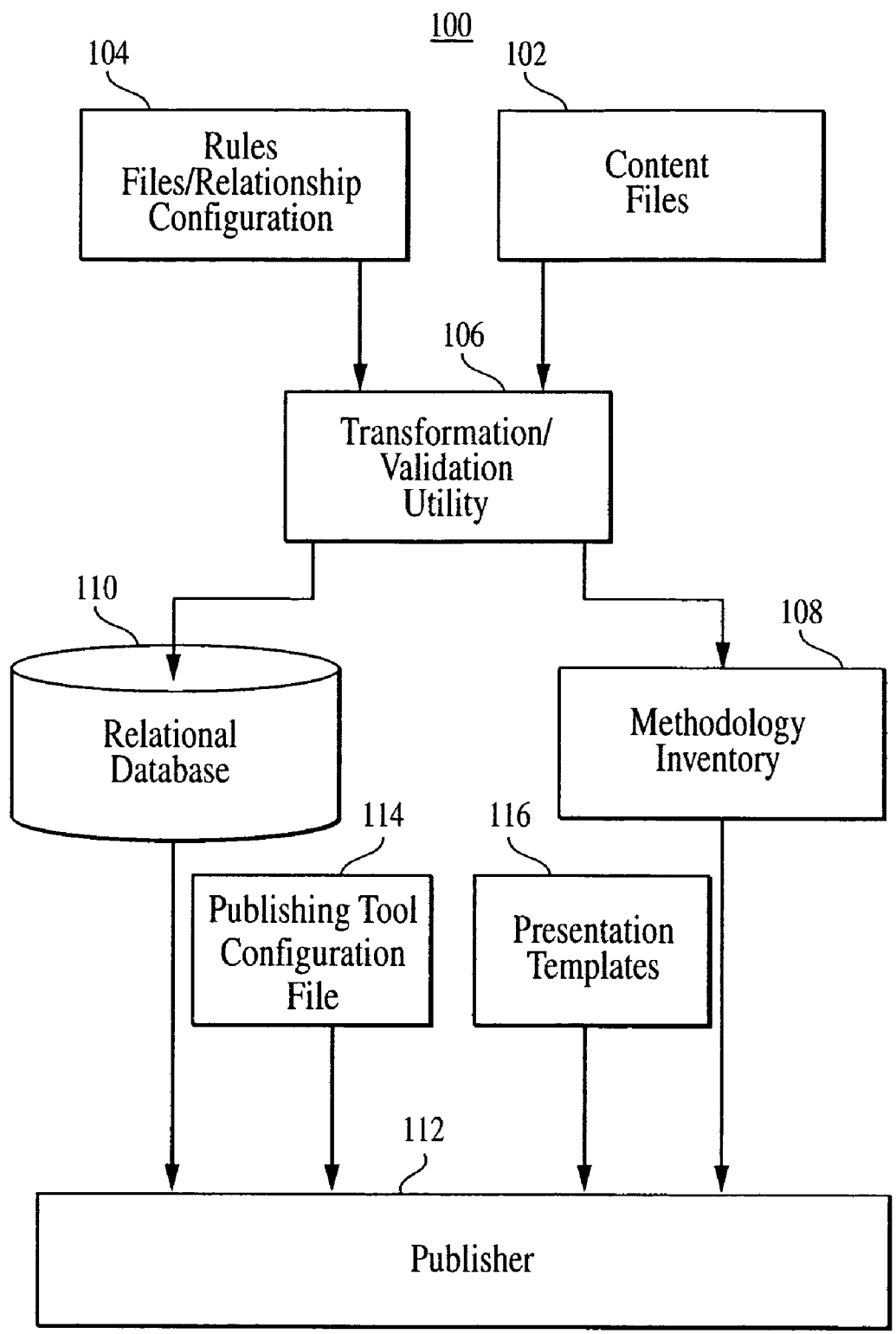
FIG. 1 is a diagram representative of the development architecture for a methodology infrastructure in accordance with the present invention.

Referring now to the drawings, and particularly to FIG. 1, the architecture for a development environment 100 of a methodology infrastructure in accordance with the present invention is shown. In one embodiment, a development environment 100 is provided for creating static web pages representative of a metadata model created for defining a methodology. As stated earlier, a methodology is a collection of information that explains how to plan, mobilize and execute a certain type of work. Defining a methodology typically requires each type of work to be decomposed into elements. In one embodiment, elements are defined as objects. Objects can have various types. For example, objects can be defined as activities, tasks or deliverables. In the development architecture 100 of FIG. 1, a plurality of content files 102 are provided. Each content file 102 is representative of an object/element of the particular methodology being defined. Additionally, the content files 102 are representative of a particular instance of each type of work. Each content file 102 defines an object containing an object type at least one object property and at least one explicit relationship. Each object is representative of a particular instance of the element of the type of work being defined in the current methodology. The object properties define variables associated with an object, while the explicit relationships define links between particular objects. It should be noted that the explicit relationships defined in the content files 102 should not be confused with the explicit relationship definitions discussed below.

Figure 2:
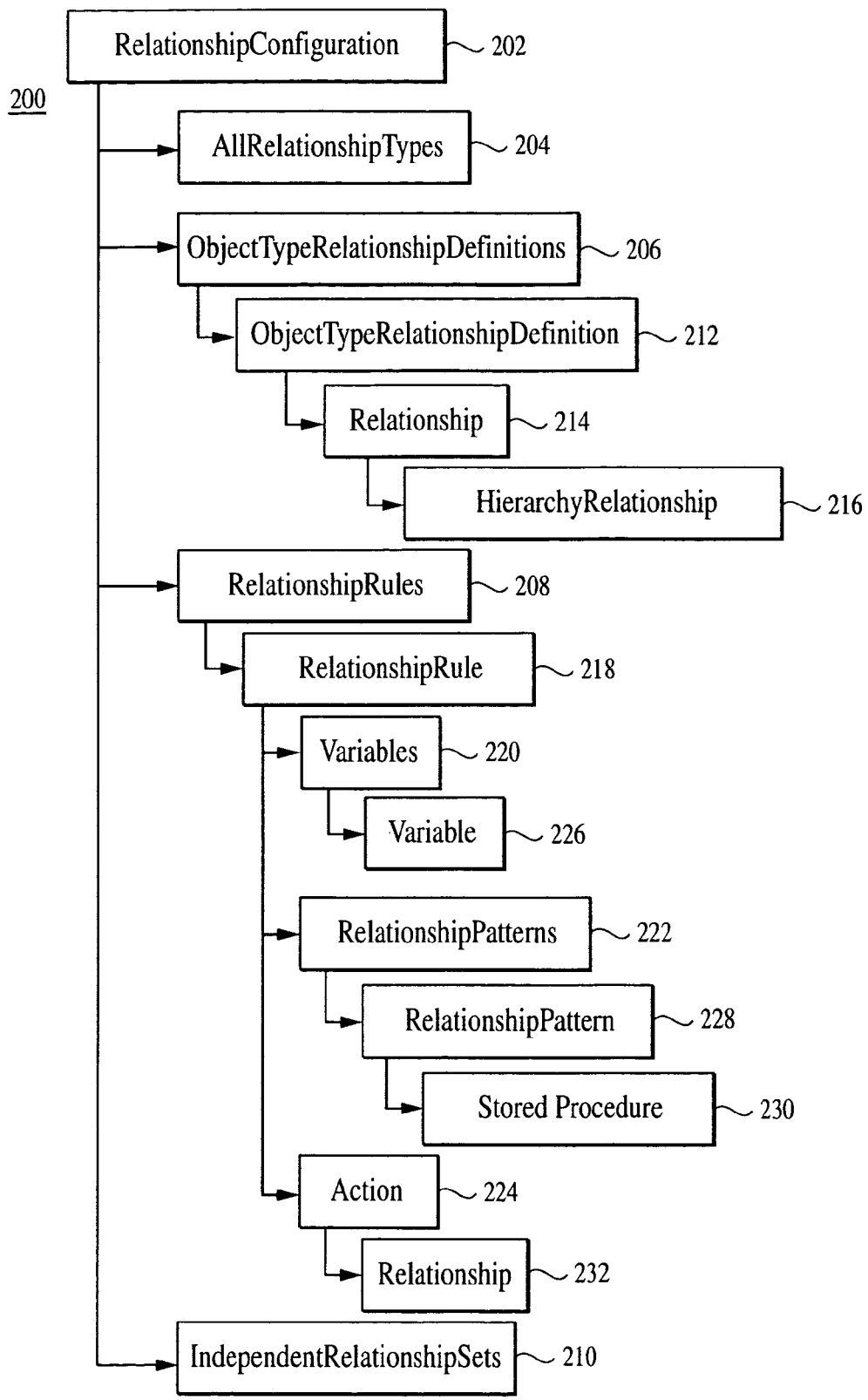
FIG. 2 is a representation of a metadata model for a relationship configuration file in accordance with the embodiment of FIG. 1.

In addition to the content files 102, a plurality of rule files 104 are also provided. The rule files 104 define relationships generally. Relationships are defined by properties and explicit relationship definitions. The relationship properties define variables associated with the relationship being defined. The explicit relationship definitions can define how object types interact with one another generally. In one embodiment, these interactions are defined in terms of actions, or relationship operations, that are to be performed when certain conditions are satisfied. The conditions can be based on the properties associated with the relationship being defined, or can incorporate static variables, also known as constants. A variety of conditions are contemplated by the present invention. For example, one condition may be satisfied if two distinct object types are explicitly defined in the content files 102 to have a particular relationship. Additionally, actions can be dependent on multiple explicit relationships defined in the content files 102 or prefaced on certain property values. Referring also to FIG. 2, in one embodiment, the rule files 104 are provided within a hierarchical framework 200, described in more detail below. Preferably, the content files 102 and rule files 104 are formatted in extensible markup language (XML).

Once all the content files 102 and rule files 104 are defined for a particular methodology, the architecture 100 of the present invention validates the information in the content files 102 with the relationship definitions of the rule files 104. In the embodiment of FIG. 1, a transformation/validation utility 106 is provided. The transformation/validation utility 106 reads the information in the content files 102 and verifies the information is proper based on the explicit rule definitions provided in the rule files 104. For example, assume a content file 102 defines an object A of type B having an explicit relationship of relationship type C with object D. Further assume that object D is of a type E. The transformation/validation utility 106 will read this information from the content file 102. The validation utility 106 then determines if objects of type B can have a relationship of type C with an object of type E by verifying the relationships defined in the rules file 104. Once verified, the transformation/validation utility 106 generates a link between the two objects to reflect the explicit relationship defined by the content file 102. Object properties may also be verified. For example, if object type C is invalid, the object property classifying object B as a type C object is incorrect. Additionally, implicit relationships and links are also generated by the transformation/validation utility 106. For example, an implicit relationship from object D to object B is also generated by the transformation/validation utility 106, as discussed below. In should be appreciated that more complex explicit relationships and implicit relationships are contemplated by the current invention.

In one embodiment, the transformation/validation utility 106 represents the explicit and implicit relationships in the form of a Structured Query Language (SQL) command. As known in the art, SQL is a language used to interrogate and process data in a relational database. SQL commands can be used to interactively work with a database or can be embedded within a programming interface to a database. In one embodiment, the SQL commands are generated by the transformation/validation utility 106 and stored in the rule files 104, as described below in reference to FIG. 2. The transformation/validation utility 106 performs a validation/transformation on each object described in the content files 102.

Once the validation and SQL generation process is completed, the transformation/validation utility 106 extracts the data contained in the content files and transforms the data into two components. First, a methodology inventory file 108 is created, listing each object defined in the content files 102. Next, the object properties, explicit relationships, implicit relationships and links are entered into a relational database 110, described in more detail below in reference to FIG. 4.

A publisher utility 112 is provided with an optional configuration file 114 to create static Internet documents, in a known manner. In the embodiment of FIG. 1, a plurality of presentation templates 116 are provided to define a format for the Internet documents. As known in the art, the publisher utility 112 is adapted to access the relational database 110 and populate various fields in the presentation templates 116 incorporating the various relationships reflected in the database. In this way, the present invention is able to ensure maximum accessibility to a particular methodology, while maintaining enough flexibility to quickly adapt to changes in the methodology's content.

FIG. 2 shows an exemplary relationship configuration metadata model 200 in accordance with the development environment 100 embodiment of FIG. 1. A root element RelationshipConfiguration 202 is provided and assigned a unique Methodology ID. The Methodology ID uniquely identifies the methodology for which the configuration file is used. By assigning a unique RelationshipConfiguration 202 root element for each methodology, the methodology infrastructure of the present invention is able to define a different set of relationships and relationship rules for each methodology. Thus, the present invention is able to maximize reuse and flexibility in that different methodologies are able to quickly reuse established relationship data while the overall structure is flexible enough to allow entirely new relationships to be quickly incorporated into the metadata model. In addition to a unique Methodology ID, each RelationshipConfiguration element 202 contains four children elements: AllRelationshipTypes 204; ObjectTypeRelationshipDefinitions 206; RelationshipRules 208; and IndependentRelationshipSets 210.

The AllRelationshipTypes element 204 is a root element of all relationship types. Each relationship type for the unique methodology relationship configuration being defined is listed under the AllRelationshipTypes 204 element. In this manner, a list of valid relationships is easily accessible for validating the explicit relationships defined in the content files 102. In one embodiment, relationships types can be attachment, checklist, container, contains, deliverable, deliverable checklist, deliverable, deliverable-checklist, deliverable-to-transition, external-reference, inventory-list, job-aid, next, participating-process, participating-role, previous, primary-deliverable, primary-input, process-checklist, process-job-aid, reference-material, related-process, related-topic, responsible-deliverables, responsible-processes, role-checklist, role-for-provisioning-team, role-for-receiving-team, role-job-aid, sample, secondary-deliverable, secondary-input, template, where-created, where-referenced, or linked-object-list relationships.

The ObjectTypeRelationshipDefinitions element 206 is a root element of the actual relationship definitions. The ObjectTypeRelationshipDefinitions element 206 comprises an ObjectTypeRelationshipDefinition element 212 for each object type defined in a particular methodology. Each ObjectTypeRelationshipDefinition element 212, in turn, comprises a unique object type identifier and may contain children Relationship elements 214. The object type identifier is representative of the type of object where the relationship being defined starts. Preferably, each object type should contain several Relationship elements 214 contained under this element. The Relationship elements 214 define the relationships. Typically, relationship names and the types of objects targeted by a relationship are contained in each Relationship element 214. In one embodiment, additional information is included in each Relationship element 214 to further define the relationship, such as identifiers to denote whether a relationship is explicit or if it can be copied to another methodology. Additionally, each Relationship element 214 may contain a HierarchyRelationships element 216, discussed below in reference to FIG. 3.

The Relationship Rules element 208 is the root element for all the relationship rules defined for the current methodology. Depending on the relationships defined in a particular methodology, the Relationship Rules element 208 may have RelationshipRule 218 children elements. Each RelationshipRule element 218 defines a condition and an action to perform when the condition is met. Preferably, several rules are defined for several types of conditions. The RelationshipRule element 218 may have a unique ID for the rule being defined. Additionally, three children elements are defined for each RelationshipRule element 218: a Variables element 220; a RelationshipPatterns element 222; and an Action element 224.

Each Variables element 220 contains one or more Variable element 226 that will be used within the tool. Each Variable element 226 has a unique ID associated with it. Constants, or static variables, may optionally be defined within the Variable element 226.

Each RelationshipPatterns element 222 contains one or more RelationshipPattern elements 228. The RelationshipPattern element 228 defines the conditions that must be met for the relationship rule being defined. These conditions are called patterns. Multiple patterns can be defined, and each pattern must be met in order to perform the action for the particular rule. For example, a pattern can be a condition where any two objects have a specific relationship and one of the objects also has a specific relationship with another object. The RelationshipPattern element 228 must define a "from" object and a "to" object for the relationship being defined.

The Action element 224 describes the relationship operation to perform when the conditions for a particular rule are satisfied. In one embodiment, the actions can be to create or delete an implicit relationship, depending on the condition(s) specified in the RelationshipPatterns element 222. The Action element 224 contains one or more Relationship elements 214. Each Relationship element 214 defines the relationship operation performed, and must contain a relationship type, from object and to object identifier.

Referring also to FIG. 1, the transformation/validation utility 106 generates a SQL command representative of the conditions defined by each RelationshipPattern 228 element and stores the command in the StoredProcedure element 230 associated with each RelationshipPattern element 228. For example, a contains type relationship, in which one object is contained by a second object, can be represented by a SQL command.

For illustration purposes of how the transformation/validation utility 106 generates a SQL command, assume a "contains by" relationship is a relationship implied by the contains relationship. Assume further that a contains relationship relies on the following variables: from, to, fromType, toType. Finally, assume a relationship pattern for the contains relationship is based on these additional variables (with values or mappings to the contains variables listed above): type (Contains); variableToType (toType); variableFromType (fromType); exists (true); fromObject(from); and toObject(to). The transformation/validation utility 106 may generate the following SQL command having the name "CoreBimRule1P1" to save in a StoredProcedure element 230. As shown below, the implied "contains by" relationship is either created or deleted if the relationship pattern is satisfied.

```
CREATE PROCEDURE dbo.[CoreBimRule1P1]
    @methodologyID as varchar(255),
    @RelationshipType as varchar(255),
    @strfrom as varchar(255),
    @strto as varchar(255),
    @FromType as varchar(255),
    @ToType as varchar(255) AS
Declare @currentPatternObject AS varchar(255)
SET @currentPatternObject=(SELECT TOP 1 [Relation-
shipWithTypes].[From_Object]
    FROM dbo.[RelationshipWithTypes] WHERE
    ([RelationshipWithTypes].[Methodology_ID]=@meth-
        odologyID) AND
    ([RelationshipWithTypes].[Relationship_Type]=@Rela-
        tionshipType) AND
    ([RelationshipWithTypes].[To_Type]=@ToType) AND
    ([RelationshipWithTypes].[From_Type]=@FromType)
        AND
    ([RelationshipWithTypes].[From_Object]=@strfrom)
        AND
    ([RelationshipWithTypes].
        [To_Object]=@strto)
    )
IF (@currentPatternObject IS NOT NULL)
    BEGIN EXEC [setRelationshipByObjectID] @method-
ologyID, @strto,
    @strfrom, 'ContainedBy' END
ELSE
    BEGIN EXEC [deleteRelationship] @methodologyID,
@strto,
    @strfrom, 'Contained By' END
GO SET QUOTED_IDENTIFIER OFF
GO SET ANSI_NULLS ON
GO
```

Figure 3:
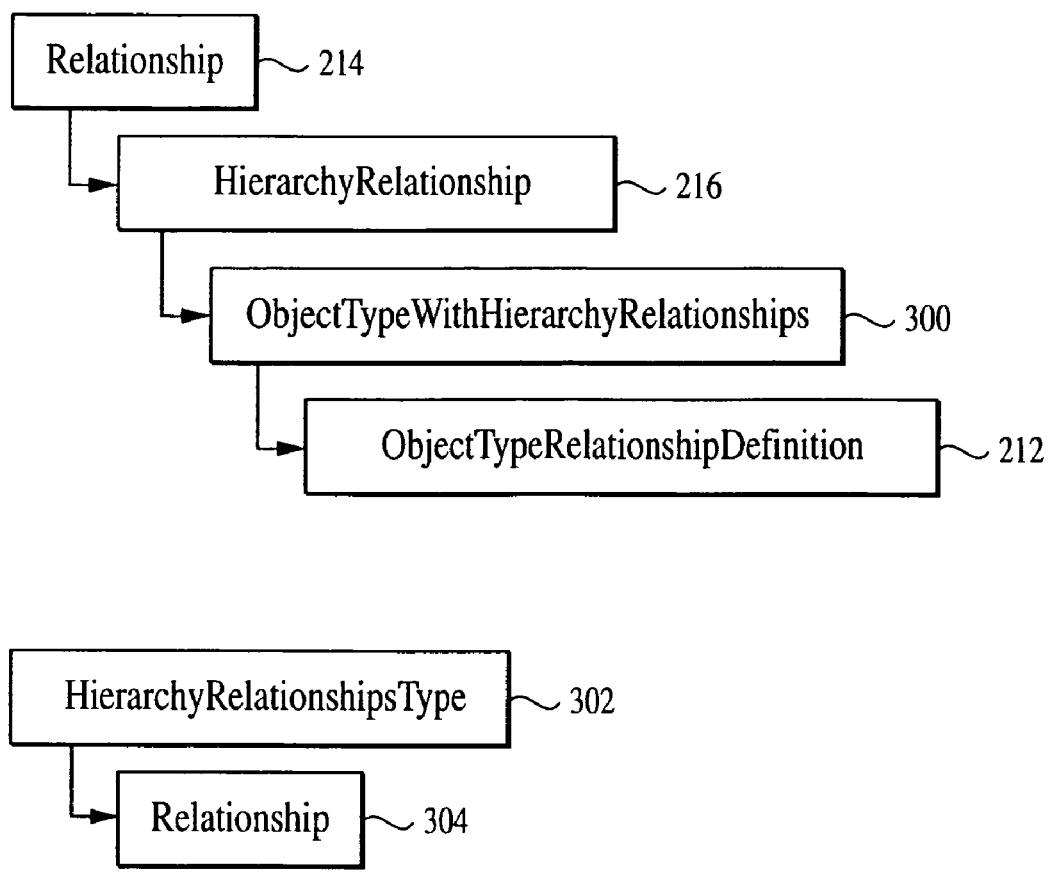
FIG. 3 is a representation of a metadata model for a hierarchical relationship definition in accordance with the embodiment of FIG. 1.

FIG. 3 shows an exemplary metadata model for representing hierarchical relationship definitions in accordance with the present invention. Referring also to FIG. 2 and as stated earlier, a HierarchyRelationships element 216 may be contained within a Relationship element 214. A HierarchyRelationships element 216 is representative of a hierarchical relationship definition. Each HierarchyRelationships element 216 contains one or more ObjectTypeWithHeirarchyRelationships element 300 that each define an object type capable of having a hierarchical relationship. Each ObjectTypeWithHeirarchyRelationships element 300 may contain one or more ObjectTypeRelationshipDefinition elements 212. In this way, the metadata model is able to identify which relationships form the hierarchy. A HierarchyRelationshipsType element 302 is also provided. The HierarchyRelationshipsTypes element 302 is a collection of one or more Relationship elements 304 that define the relationship types that can branch off a parent relationship.

Figure 4:
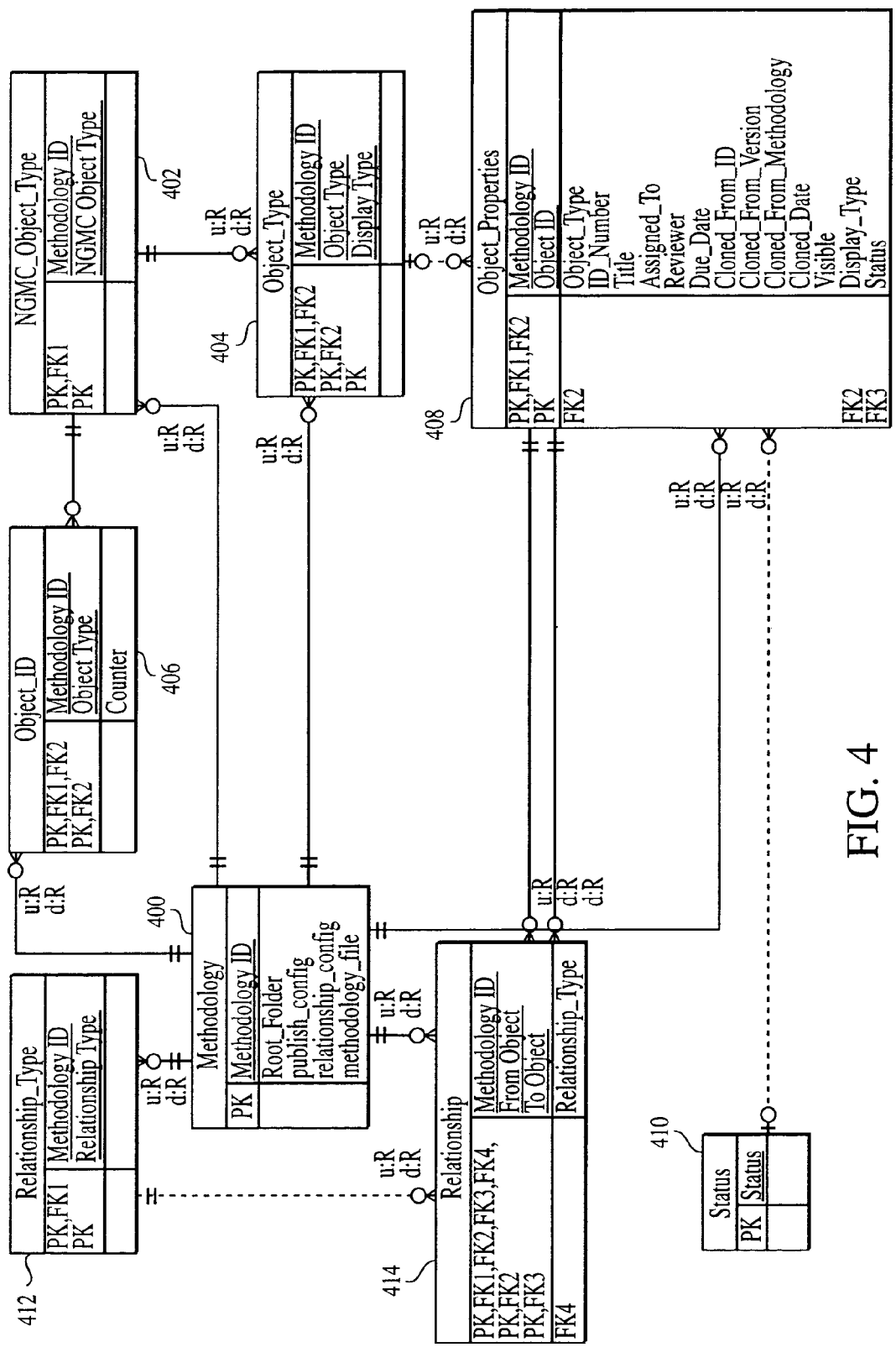
FIG. 4 is representation of the primary key/foreign key relationships between tables in a relational database in accordance with the methodology infrastructure embodiment of FIG. 1.

FIG. 4 shows the relationships of tables in the relational database 110 of a methodology infrastructure 100 in accordance with the embodiment of FIG. 1. It should be noted that the information contained in the following tables is inserted by the transformation/validation utility 106. Additionally, the tables are interrelated via primary key/foreign key relationships. As known in the art, a primary key is an indexed field, or combination of fields, that maintains the primary sequence of the table, while a foreign key is a field in a relational table that matches the primary key of another table. In this example, a Methodology table 400 is provided with a primary key field Methodology_ID. Each record in the Methodology table 400 represents a methodology being defined by the architecture 100. Additionally, each record in the Methodology table 400 may include root folder information, which defines a physical location for content files defining the methodology, publishing configuration information, relationship configuration information, and inventory information.

Next, an NGMC_Object_Type table 402 is provided with a primary key consisting of a combination of the foreign key Methodology_ID field and the NGMC_Object_Type field. The NGMC_Object_Type table 402 represents a collection of standard object types used across multiple methodologies. By providing this table, the present invention is able to maximize efficiency by incorporating standard object types into multiple methodology definitions. Multiple NGMC_Object_Type records can relate to a single methodology record. In other words, one methodology can incorporate multiple standard object types.

An Object_Type table 404 is provided with a primary key combination of foreign key Methodology_ID, a foreign key Object_Type field and a Display_Type field. The Object_Type table 404 maintains a record of each methodology specific object type. Each methodology may contain multiple object type definitions.

An Object_ID table 406 is provided with a primary key combination of foreign key Methodology_ID and foreign key Object_Type. Each record in the Object_ID table 406 represents a unique object used to define a particular methodology. Additionally, a Counter field representative of the total number of similar objects for a given methodology may be included in the Object_ID table 406. Each methodology may contain multiple Object_ID table records.

An Object_Properties table 408 is provided with a primary key combination of foreign key Methodology_ID and an Object_ID field. Each record in the Object_Properties table 408 represents a unique object used to define a particular methodology. Additionally, multiple fields representative of various object properties for a particular object may be included in the Object_Properties table 408. In one embodiment, foreign keys Object_Type, Display_Type and Status as well as ID Number, Title, Assigned_To, Reviewer, Due_Date, Cloned_From_ID, Cloned_From_Version, Cloned_From_Methodology, Cloned_Date and Visible fields are all used to define various properties of an object. Each methodology may contain multiple Object_ID table records.

A Status table 410 is provided with a primary key Status field. Each record in the Status table 410 represents a possible state for an object defined in the methodology. Multiple objects defined in the Object_Properties table 408 are capable of having the same status.

A Relationship_Type table 412 is provided with a primary key relationship combination of foreign key Methodology_ID and a Relationship_Type field. Each record in the Relationship_Type table 412 represents a generic type of relationship for a particular methodology. Each methodology may contain multiple relationship types.

A Relationship table 414 is provided with a primary key relationship combination of foreign key Methodology_ID, foreign key From_Object field that references an Object_ID from the Object_Properties 408 table, and a foreign key To_Object field that references a second Object_ID from the Object_Properties 408 table. Each record in the Relationship table 414 represents a specific relationship definition for a particular methodology. Additionally, the foreign key Relationship_Type may be included in the Relationship table 414. Each methodology may contain multiple relationships, as can each relationship type defined in the Relationship_Type table 412.

Figure 5:
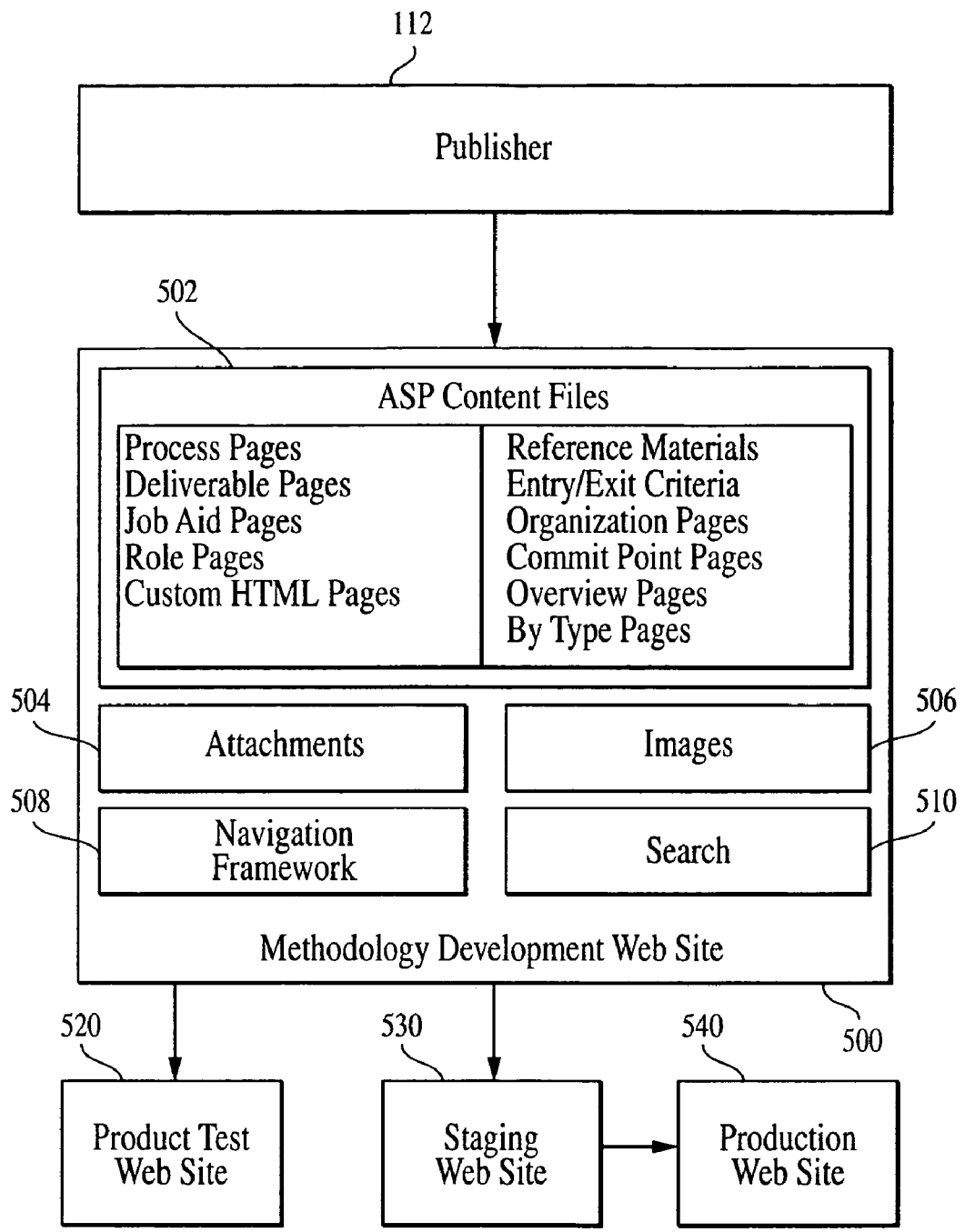
FIG. 5 is a diagram of the data flow of one embodiment of a methodology publishing environment in accordance with the present invention.

FIG. 5 shows a representation of the data flow of the publishing environment of the development architecture of FIG. 1. Referring also to FIG. 1, the publisher utility 112 creates static Internet documents by populating fields in presentation templates 116 with data contained in a relational database 110. The publishing utility 112 writes individual files and organizes these files into a methodology development web site 500. The methodology development web site 500 is organized into five categories of document types. A collection of Active Server Pages (ASP) content files 502 are provided. This collection contains the content pages for describing methodologies through the multiple interfaces described below. These pages can describe processes, deliverables, job aids, roles, reference materials, entry/exit criteria, organizations, commit points, overviews, lists ordered by type, or other custom HTML pages. Any attachments or images embedded in the content pages 502 are organized into the attachments collection 504 or images collection 506, respectively. All documents used to define and implement the navigation structure defined below in reference to the multiple user interfaces are organized into a navigational framework collection 508. Finally, the search collection 510 contains the documents and tools required to perform the search functions described below in reference to the multiple user interfaces.

Optionally, the methodology development web site can be published using a standard publishing tool, such as Front Page Publisher provided by Microsoft Corporation of Redmond, Wash., to create the product test 520 and staging 530 web sites. As known in the art, product test 520 and staging 530 web sites allow developers an opportunity to find errors in the pages and/or content of the documents. Once the testing and staging process is complete, the production version of methodology development web site 540 is published to the methods production repository described below.

Figure 6:
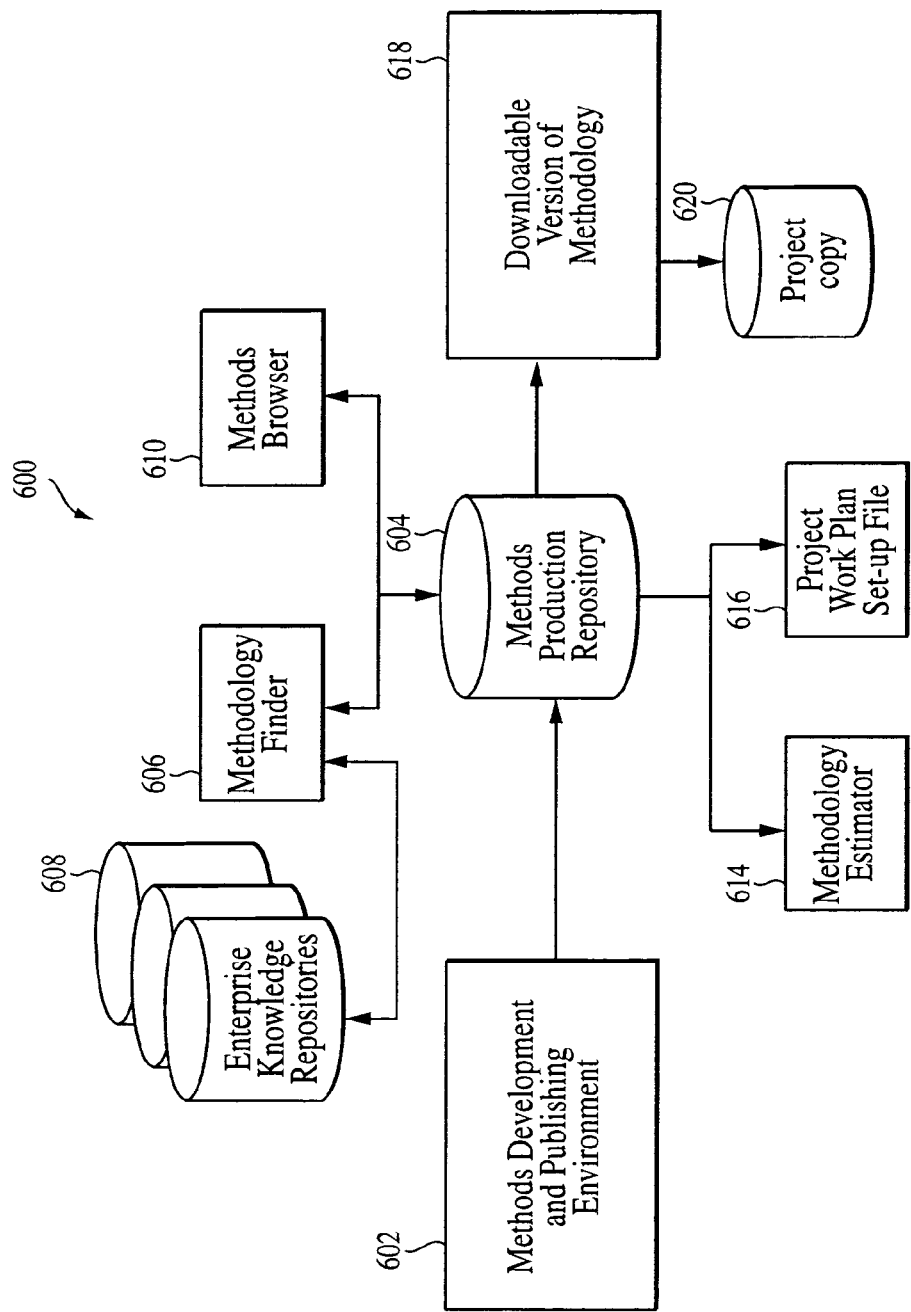
FIG. 6 depicts a schematic of the end user environment for the methodology infrastructure and delivery vehicle in accordance with the present invention.

Having described the details of the preferred embodiment of the development environment, a preferred embodiment of the end user environment will now be described. Referring to FIG. 6, a schematic depiction of the end user environment 600 is shown. The end user environment presents multiple user interfaces for a user to access and deliver methodology content and related supporting reference material within the enterprises management repositories and other external Internet links. The end user environment is part of what is referred to as the Next Generation Methods Capability (NGMC) infrastructure, which represents an integrated suite of tools that help end users plan and mobilize their projects quickly and efficiently. The infrastructure also makes it easy for methodology experts to develop new methods to support different types of work. The main tools that are a part of this infrastructure include the methods development tool in the development and publishing environment 602, the methodology finder 606, the methods browser 610, and the estimating tool 614, which also includes the project work plan tool 616.

The methods development tool which is part of the development and publishing environment 602, has been described in detail above. But in brief, this is the environment for developing formal and reusable methods either from scratch or reusing existing methods content. The methods development tool allows experienced users to use advanced development functions to rapidly deploy new and updated methodology content. The development and publishing environment is typically only accessible by methods development teams. This environment includes a methods development repository which contains content of both core and specialized methodologies that are structured and formatted to maximize productivity.

Updated and validated methodology documents are published to a methods production repository 604. The methods production repository 604 contains read-only content of core and specialized methodologies. As will be explained later, the format of the data in this repository 604 is optimized to support the functionality and features that are critical to the end user. A core methodology is one of a set of a broad-based, standardized firm-wide methodologies intended to support a wide range of engagements and projects in any organizational, industry or technological context. The scope of each core methodology has been updated to align with the scope of current projects but still retain the common core of proven best practices of the standard approach for how to plan, manage and execute client transformations. The methodology content is organized around documents such as processes, deliverables, and job aids. They are also broadly structured in terms of phases and stages of work. Each core methodology also includes a pre-configured estimating model in a spreadsheet format that also has an ability to export into a project work planning reports. Additionally, other applications can be utilized in place of a spreadsheet format, as known in the art. The methods production repository 604 also includes specialized methodologies, which are specific methodologies that extend the core methodologies content to a more targeted specific business solution.

The methodology finder 606 is a browser-based user interface for accessing methodologies and related documents. Typically, the methodology finder 606 can be considered as a starting point for locating the core methodologies. The methodology finder 606 allows a user to search for core methodologies and specialized methodologies in the methods production repository 604. The methodology finder 606 also allows a user to search for related documents on the enterprise knowledge repositories 608. Optionally, through the methodology finder 606 a user may also access relevant documents from the public Internet.

The methods browser 610 is another browser-based user interface for accessing core methodologies from the methods production repository 604. The methods browser 610 is optimized for viewing and navigation of the methodologies by the end user. As such, it is focused on browsing through and searching through a single methodology at a time.

The end user environment 600 also includes an estimating tool 614. Associated with each core methodology, a spreadsheet-based estimating tool has been developed that includes a standard set of activities corresponding to the activities in the core methodology. These estimating tools are accessible from the methods browser. The estimating tool 614 is downloaded and may be modified in scope. A project work plan setup file 616 is downloaded and is used to install necessary supporting components for the work planning tool. A downloadable version of the methodology 618 may be downloaded as an offline copy 620 of a core methodology. In addition, the downloadable version 618 and methodology may include deliverables, tasks and other key samples for use during an engagement.

Figure 7A:
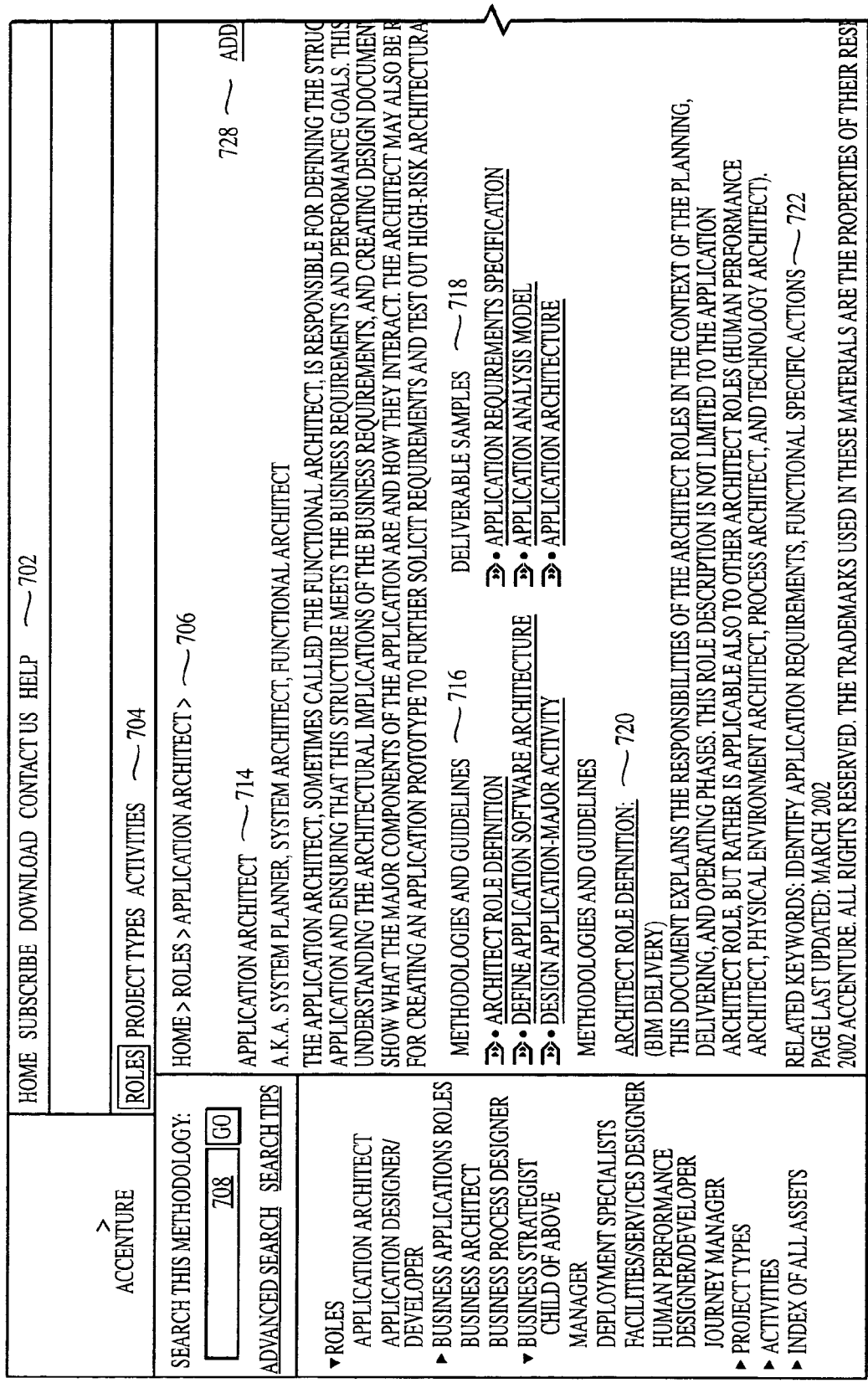
FIG. 7 is a representative screen shot of a methodology browser user interface in accordance with the present invention.

Referring now to FIG. 7, a screen shot of a methodology finder page 700 is shown. The methodology finder browser window provides a consistent format and standard interface that makes locating relevant methodologies fast, simple and intuitive. At the top of the screen, a series of navigational links to common applications 702 is located in a banner-type arrangement. Below that is another banner of navigational links to different topical content such as roles, project types, and activities 704. Below the topical navigation banner is the active display window 712 where the searchable results and documents are displayed. At the top of the search result window, a hierarchical path 706 is displayed to show the user where they are located within a topical tree. The methodology finder user interface 700 also includes a standard search engine with a text input field 708. The search engine also provides links to open an advanced search window and links to help for additional search tips. Below the search window, a table of contents tree navigation link window 710 is located. The table of contents is located in a hierarchical manner with collapsible and expandable contents to assist a user to topically navigate to the information of interest at the desired level of detail. The table of contents tree navigational links 710 or navigators include the main topical content of roles, project types, activities and index of all assets similar to what is located up at the topical banner navigators 704.

Within the active search results window 712, the search results or documents relevant to the search results or the topical location are displayed. For example, as is currently shown, the details for the role of an "application architect" 714 are shown. Below the brief description of the role, there are hypertext links to several documents within the "methodologies and guidelines" 716 that are relevant to the application architect role. Also, there are displayed a variety of "deliverable samples" 718 with hypertext links to the relevant samples corresponding to the application architect role. In the lower part of the search result window 712, a brief abstract of the selected document describing the "architect role definition" 720 is displayed. For access to the complete document, a user would double-click on the hypertext link of the document title. In addition and to assist the user in locating other relevant documents, related key words 722 are displayed at the bottom of the window.

On the right side of the browser user interface 700, additional helpful information is displayed. A link to the main home page of the relevant core methodology 724 is displayed. To further assist the user in locating relevant documents, a list of suggested related documents is also provided in the "see also" window 726. To further assist the user, an "add to my subscription" link 728 which provides a mechanism for users to register as a user for that particular document is displayed. Whenever updates are made to that particular document, all registered users of the document would receive an e-mail advising them that there has been an update to that document. The content may be highlighted to point out the core methodologies. One way to highlight this is to use a "core methodology" chevron symbol 724.

All these different features that go into the methodology finder user interface provide several advantages to the end users. The methodology finder acts as a warehouse for all method assets, each addressing a relatively specific engagement situation. The methodology finder can be used as a starting point for using the core methodologies. The methodology finder gives quick access to a user to locate the official best practices standards for various work domains. The methodology finder is also a quick mechanism to help users locate additional supporting references to match their engagement needs: such as non-core methodologies reference materials, job aids, learning assets, knowledge management assets, etc.

Figure 8:
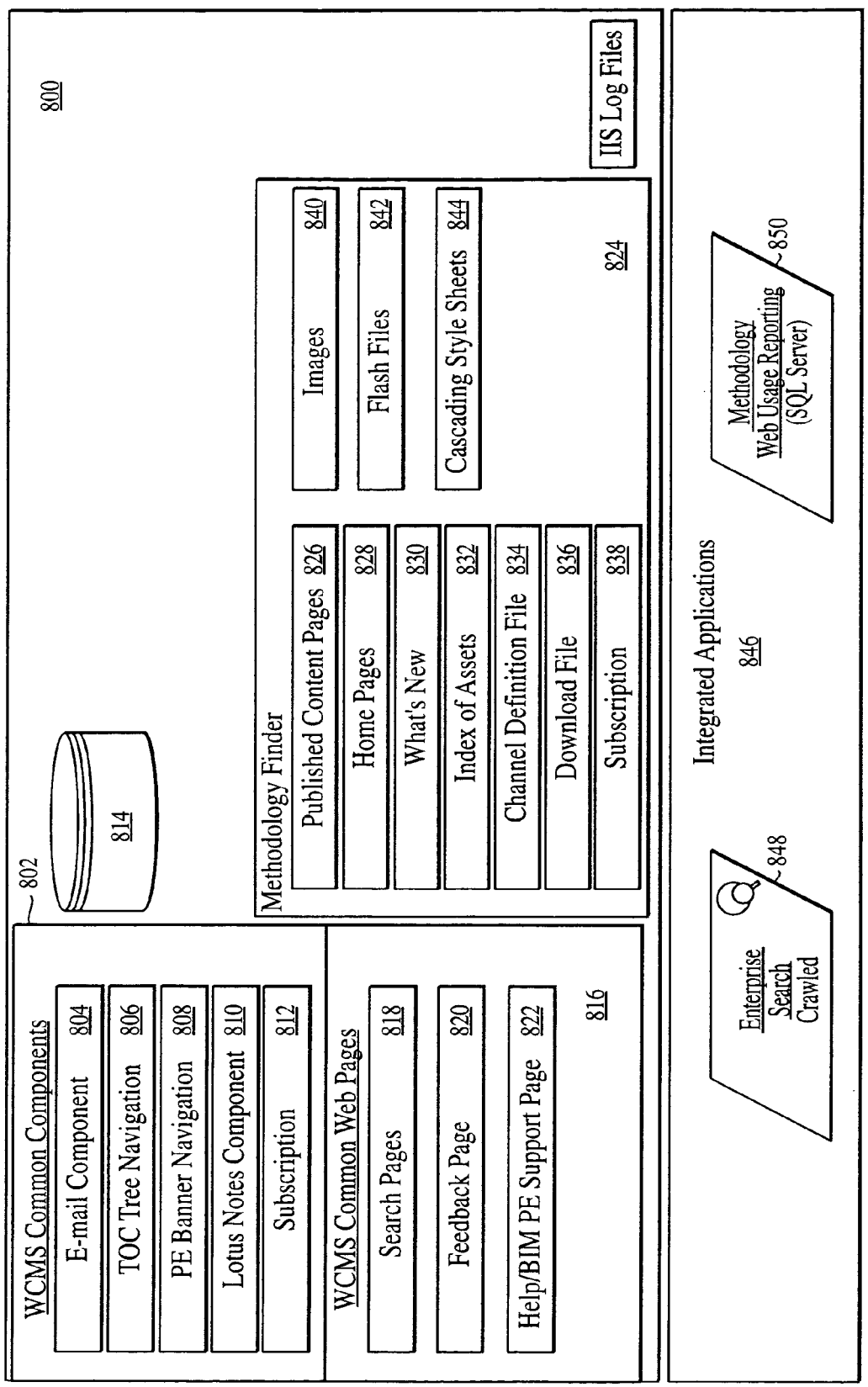
FIG. 8 is a diagram representative of the technical framework for the methodology finder user interface of FIG. 7.

The technical architecture 800 supporting the methodology finder is depicted in FIG. 8. The architecture includes web content management system (WCMS) common components 802. The common components 802 are software components that are shared across several web sites, but can be customized for each web site. These common components include an email component 804 for contacting methodology finder support personnel. Another common component includes the table of contents (TOC) tree navigation hierarchical links 806. Another common component is the set of people enablement (PE) banner navigational links 808. These include links to the main utilities 702 and the topical links 704. Another common component is the set of Lotus Notes links 810. The Lotus Notes links 810 is a software component designed to allow various web pages to link to specific Lotus Notes database documents. Another common component is the subscription application 812. The subscription application 812 maintains a database 814 of registered users to particular documents and methodologies maintained by the personnel supporting the methodology finder.

The methodology finder architecture 800 also includes WCMS common web pages 816. Using the text-based search engine 708 of the methodology finder, the user accesses the common search pages 818. By clicking on the link to "contact us" in the PE banner navigational links 702, a user pulls up the common feedback page 820. Likewise, clicking on the "help" link in the PE banner navigational links 702, a user pulls up the common help support page 822.

In addition, the architecture includes web-based pages specific to the methodology finder 824. The bulk of the specific pages for the methodology finder include the published contents pages 826. These include all of the detailed content documents, methodologies, guidelines, deliverable samples, job aids, etc., that are viewable in the active search results window 712 of the methodology finder user interface 700. The methodology finder specific web pages also include a series of web pages that assist the user in navigating through the plethora of content as well as providing useful access to utilities. These specific pages include home pages 828, which act as the main entry portal for the methodology finder 824. The home page may also provide information of interest to users such as a list of most-commonly visited topics by the users, and also the most-visited assets or documents by the users. Another specific content within the methodology finder 824 includes the "what's new" pages 830. These pages 830 provide an update for users with links of new assets that have been added to the methodology finder 824. The index of assets pages 832 maintains the updated index of all of the assets that are accessible through the methodology finder. This may be likened to a topical outline of all the assets that the methodology finder support personnel consider to be useful and relevant to support engagements involving use of the methodologies. The channel definition file 834 is used for defining the list of web pages that can be downloaded from the methodology finder 824 site. It can be used by a standard web browser to download several pages of a website, and synchronize the downloaded web site at regular intervals. The download page 836 presents a common interface for use of the download utility to download useful content onto a local workstation. The subscription page 838 maintains the common web page for accessing the e-mail subscription utility.

In addition, the methodology finder specific architecture includes the files for images 840, the flash files 842 and cascading style sheets 844 that comprise the presentation style, or look and feel, of the methodology finder 824.

The methodology finder 824 is also connected to several integrated applications 846. An enterprise search application 848 provides a web-crawler-based search engine for locating relevant documents throughout the corporate enterprise knowledge repositories 608 and also documents located on the external Internet. A hypertext link to the enterprise search may be located in the main utility banner navigational links 702 of the methodology finder interface 700. Another integrated application is the methodology web usage reporting 850. This application tracks the usage of the methodology finder 824 and the documents that are accessed by the users. As well, the tracking of the usage is valuable for determining which assets and documents and methodologies should be updated. The web usage reporting application 850 can provide statistics such as the number of unique users per month, the overall return of users per month, the unique users for each methodology and tracking the assets accessed per month. The web usage reporting application 850 can also report demographics such as usage according to global market unit or business division of the enterprise, usage by employee level such as analyst consultant, manager, senior manager, associate partner, or partner, for example, as well as identifying the percentage of employees within a specific business division or global market unit that have accessed the methodology finder 824. In addition, the web usage reporting application 850 can keep track of search strings entered by users. This is helpful for providing updates to the finder with additional information and search aids to enable quick identification of assets that are commonly searched for. Presently, significant updates, editions and editing of the methodology content pages are completed roughly 10-12 times per year.

Figure 9A:
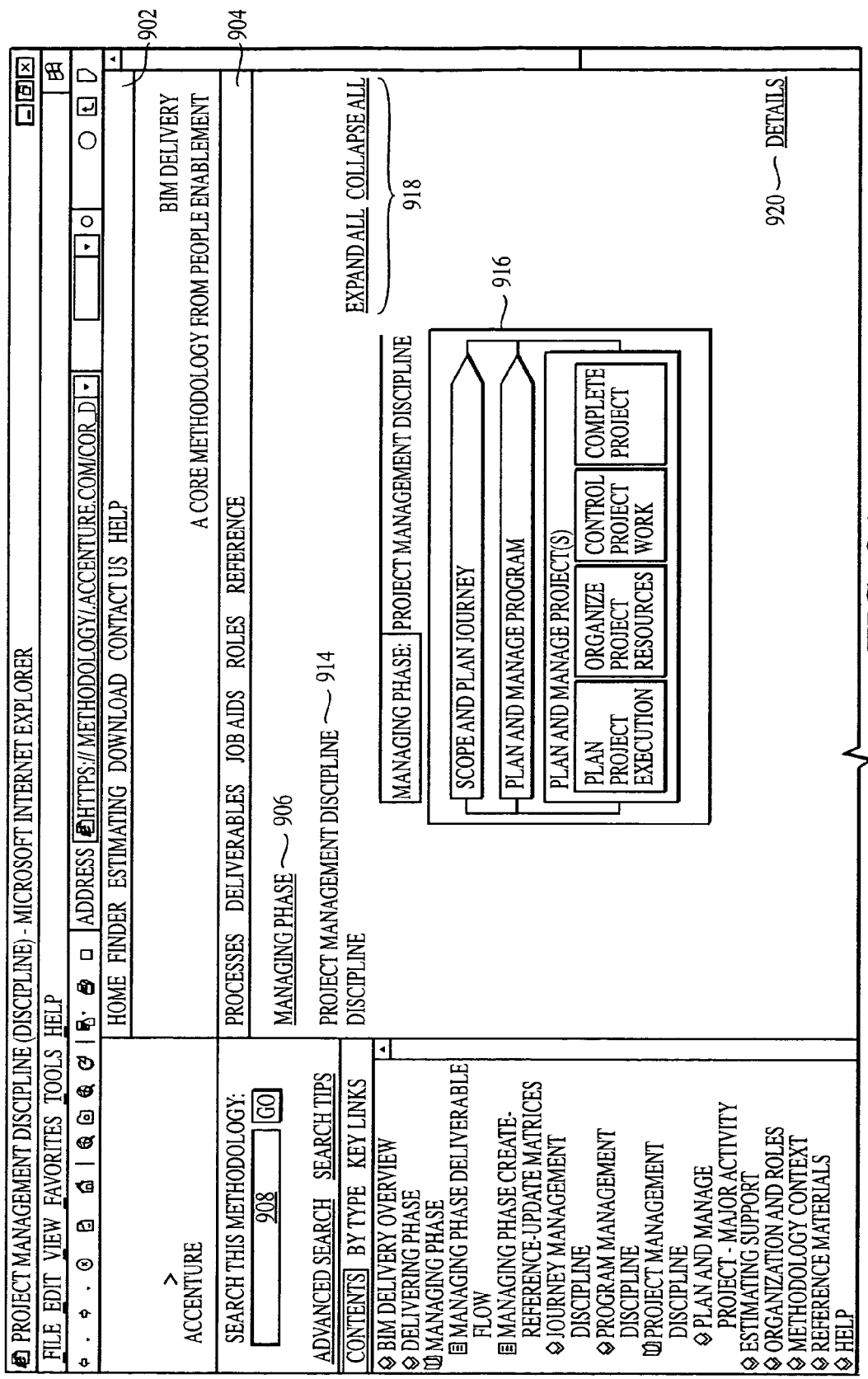
FIG. 9 is a representative screen shot of a methodology browser user interface in accordance with the present invention.
Figures 9, 9B:
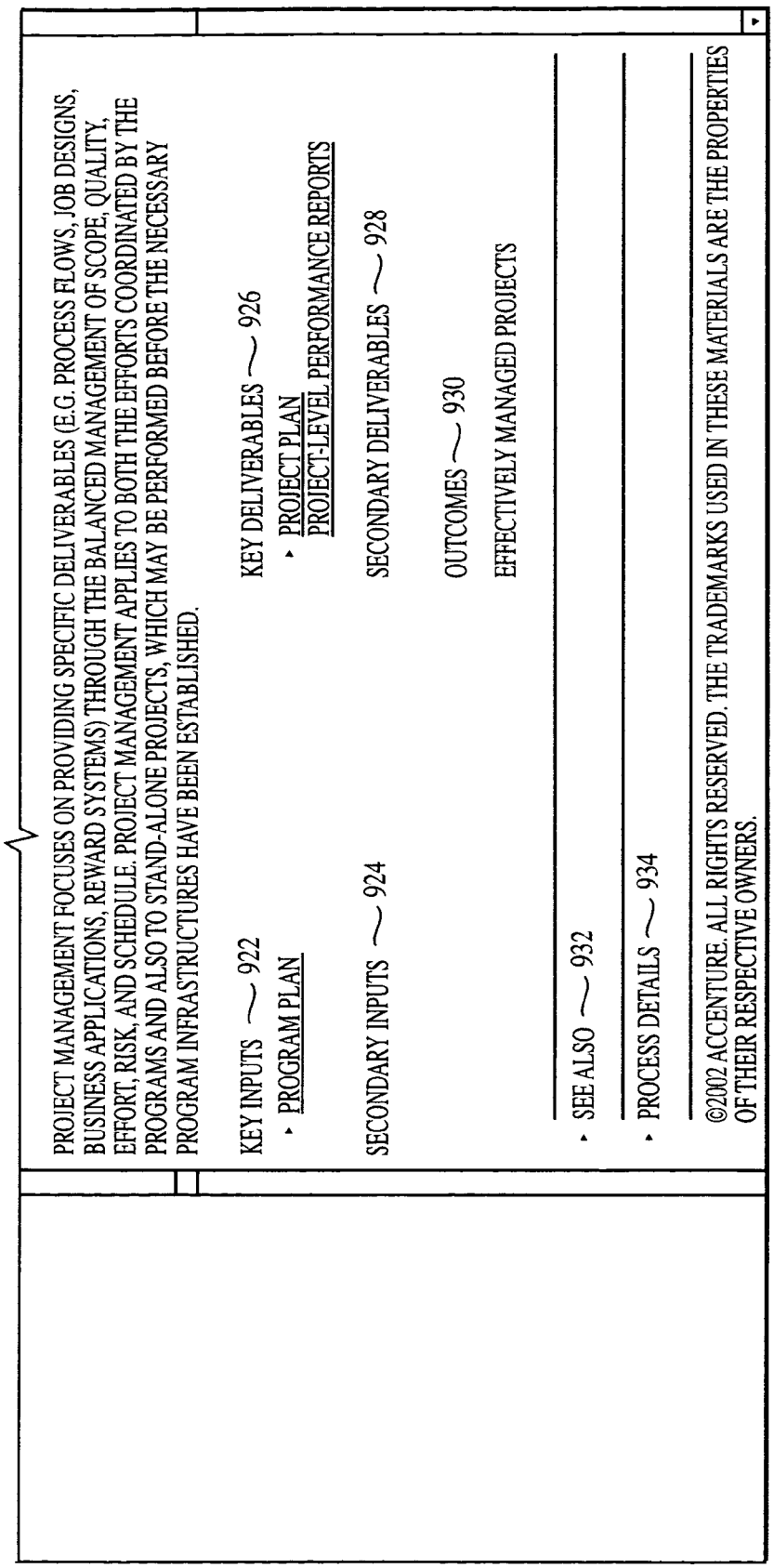

After locating a relevant methodology through the methodology finder or if the user already knows the relevant methodology they desire, the user may access the methods browser user interface. FIG. 9 depicts a screen shot of the methods browser user interface 900. The methods browser user interface 900 includes a similar look and feel as the methodology finder user interface 700 shown in FIG. 7. One accesses the methods browser user interface 900 typically by selecting a core methodology found in the methodology finder user interface. After selecting a core methodology, the content of the core methodology will appear within the methods browser user interface 900. The methods browser is a shared interface and architecture for browsing the core methodologies which each focus on a specific domain of work. The methodologies are linked to a repository of sample documents to highly enable users in the scope of client engagements. The methods browser presents the core methodologies to users in a simple, consistent, easy to navigate interface. A core methodology may contain more than 100 task packages and more than 800 deliverables. The methods browser may present these task packages and deliverables in a intuitive, topically hierarchical format with hypertext links between different tasks and activities and deliverable documents.

Referring now to FIG. 9, the methods browser user interface 900 includes a banner-type utility application bar 902. This utility bar provides access to basic utilities for the site and includes access to the home page for the methodology, can provide a link to bring up the methodology finder 824 in a new window, can display the estimating tool information associated with the current methodology, provide a link to the download page that allows a user to download a local copy of key methodology documents, provides a link to the contact us page for sending feedback or contacting technical support, and also provides a link to the help page.

Below the utility bar 902 is the functional navigation bar 904 which presents a banner of links to provide fast access to top level content for the methodology. The top level content is organized topically according to the process flows, deliverable flows, job aids, roles for the methodology and reference materials. Below the functional navigational bar, an active search results window 912 displays the current content selected by the user. For example, immediately below the functional navigation bar 904 is shown a topical outline 906 of exactly where within the core methodology these specific content is displayed. For example, as shown here, the current content is related to the managing phase of a methodology process. In this example, the core methodology is titled BIM delivery.

In the left sidebar, the user has access to a text entry field 908 for a search engine. This text-based search engine does text-based searches only within the current methodology displayed in the browser 900. The advanced search link calls up an advanced search page that provides for more sophisticated search options such as phrase searches and Boolean searches. The search tips link displays detailed instructions on using the advanced search functions.

Below the search engine window in the left sidebar is the table of contents navigational links. The table of contents navigational links provide structured access to all of the content within the current methodology. The table of contents has three tabs: contents, by type, and key links. The contents tab displays the table of contents in a hierarchical or conceptually structured view. As presented in FIG. 9, the structured hierarchical view is a typical collapsible or expandable tree hierarchy. The "by type" tab provides hierarchical navigational links of the content pages organized by the document type. The "key links" tab displays a key links page with links of particular interest for reviewing the current methodology, or obtaining help in estimating or managing the project, or accessing additional knowledge resources. In the table of contents navigational links, clicking an icon expands the list to show the content under that item. Clicking an item in the list displays that document in the active search result window content area.

Within the active search results window 912, the current document within the methodology is displayed. The documents have a consistent look and feel. For example, the top of the document includes the document title 914. Also, within higher level content documents, a process flow diagram showing the flow of the main tasks or activities falling within the scope of that document are displayed in a graphical image 916. If additional detail is available for each subtask corresponding to a box in the graphical image 916 is available, then the box will be an active hyperlink to the additional content detail. Clicking on that box then would replace the current document in the active search window with the detail of the selected document. The active search window also displays additional navigational links in the active window with buttons to expand or collapse 918 or provide additional detail information 920 of the current document.

The typical task and activity process documents include a consistent presentation template that provides access to additional supporting documents. For example, as shown in FIG. 9, the project management discipline task includes a variety of associated documents. These associated documents relate to one or more of key inputs 922, secondary inputs 924, key deliverables 926, secondary deliverables 928 and outcomes 930. The inputs and deliverables and outcomes generally include hypertext links to the associated documents describing details of the inputs or deliverables. Often, the inputs 922 and 924 and deliverables 926 and 928 include a hierarchy of supporting detailed documentation. Those details may be accessed by expanding or collapsing the navigational icon associated with each document. Likewise, clicking on the hypertext link will call up the relevant document in the active search results window. Additional supporting information is presented at the bottom of the active search window which includes the "see also" 932 listing of additional supporting documentation, and below that, the process details area 934 providing additional detailed information in support of the current document. These documents may be accessed by directly clicking on the expand or collapse icon at the bottom of the window, or the expand all or collapse all button 918 at the top of the window.

By navigating through the table of contents navigational links 910 or through use of the utility bar 902, a user can call up within the active search window result the estimating tool or tools associated with the current core methodology being displayed. By linking to the estimating tool, the user is provided with reference material describing the use of the estimating tool as well as a downloadable copy of the estimating tool. Typically, the estimating tool is a spreadsheet that is populated with all of the underlying standard tasks and activities associated with the current methodology. The estimating spreadsheet includes a hypertext link for each of the activities within the core methodology. Clicking on the hypertext link in the spreadsheet calls up the detailed description of the relevant activity within the methods browser user interface. Additional information with respect to the estimating tool is discussed below.

The core methodology is hierarchically decomposed as follows: phase, stage/discipline, major activity, task package, task. Each hierarchy level provides successively narrower and more detailed content. As originally developed, the core methodologies were monolithic documents. It was difficult to find information within any particular methodology. Customizing the methodology was timely and required special content expertise. With the use of the hypertext link documents accessible through the methods browser 900, the users can easily find the relevant information in small chunks. The users may more easily and readily then customize and tailor the methodologies for their specific engagements. Within all these specific small chunks, the key to aid the navigability through and between these documents is the metadata model that defines the relationships between these different hypertext links between the documents. As described above in the development user environment, a database stores all of the definitions of the relationships between the different documents for generating the hypertext links viewable in the methods browser 900.

Figure 10:
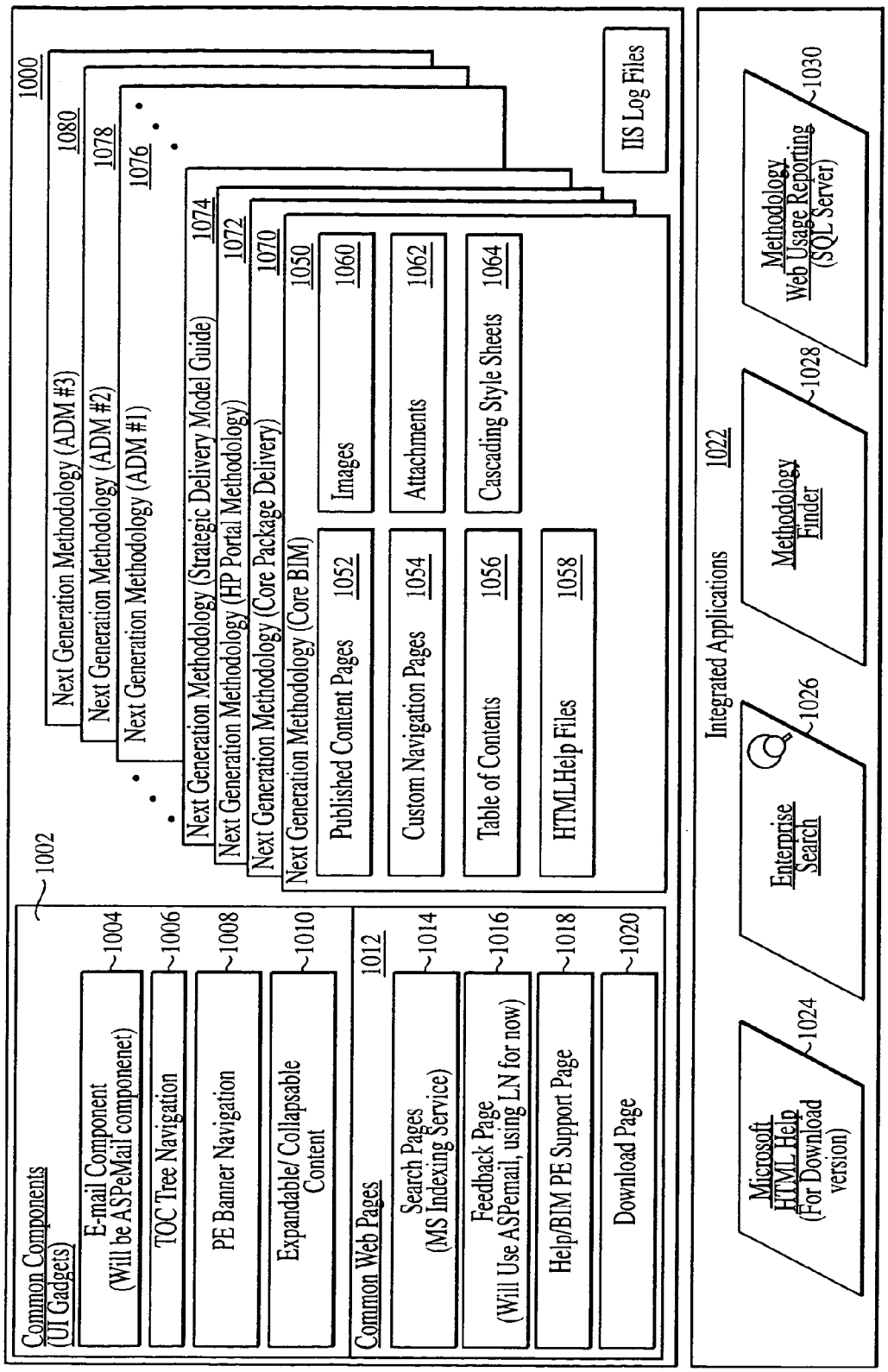
FIG. 10 is a diagram representative of the technical framework for the methodology browser user interface of FIG. 9.

The technical architecture supporting the methods browser user interface 900 is depicted in FIG. 10. Similar to the methodology finder technical architecture depicted in FIG. 8, the methods browser technical architecture 1000 depicted in FIG. 10 includes common components 1002 for the user interface. The common components 1002 are software components that are shared across several websites, but can be customized for each web site. These common components include an e-mail component 1004, a table of contents tree navigation links component 1006, which corresponds to the navigational links 910 in the browser interface 900. Another common component is the banner navigation links 1008, which corresponds to the utility bar and functional bars 902 and 904 of the user interface. The expandable/collapsible content common component 1010 corresponds to the expand-all collapse-all buttons 918 in the user interface.

The methods browser architecture 1000 also includes common web pages 1012. The common web pages 1012 are web pages that are shared across several web sites, but can be customized for each web site. These common web pages include the search engine pages 1014, the feedback page 1016 for contacting technical support, the help support pages 1018, and the download page 1020.

The methods browser architecture 1000 includes separate content framework for each core methodology. The architecture is presently shown with seven representative core methodologies which are core BIM 1050, core package delivery 1070, HP portal methodology 1072, strategic delivery model guide 1074, ADM1 1076, ADM2 1078, and ADM3 1080. The framework within each core methodology is essentially the same as depicted for the core BIM 1050. The core BIM methodology includes published content pages 1052. These are the detailed content pages that are displayed within the active search results window of the user interface. The framework includes custom navigation pages 1054. The custom navigation pages provide topical navigation through the core methodology. The framework also includes table of contents data 1056. This is the data that populates the TOC tree navigation and is displayed within the series of tabbed navigator links 910. The HTML help files 1058 provide detailed help information specific to the core methodology. In addition, the framework includes a repository of images 1060 which populate the content pages visible to the user interface. Likewise, the framework includes a repository of attachments 1062, which are the downloadable documents accessible through the content pages. The framework also includes cascading style sheets 1064, which maintain the common presentation and look and feel of the published documents in expanded or collapsed views.

In addition, the methods browser architecture 1000 includes links to integrated applications 1022. The integrated applications include Microsoft HTML help 1024 in a downloadable version of the methodology. Another application is the enterprise search engine 1026 which provides web crawling access to documents within the enterprise knowledge repositories or external Internet. Another application to which the methods browser is linked is the methodology finder 1028, which is previously described. Likewise, another integrated application is the methodology web usage reporting 1030 which provides similar features as the methodology web usage reporting application 850 as described above.

Figure 11:
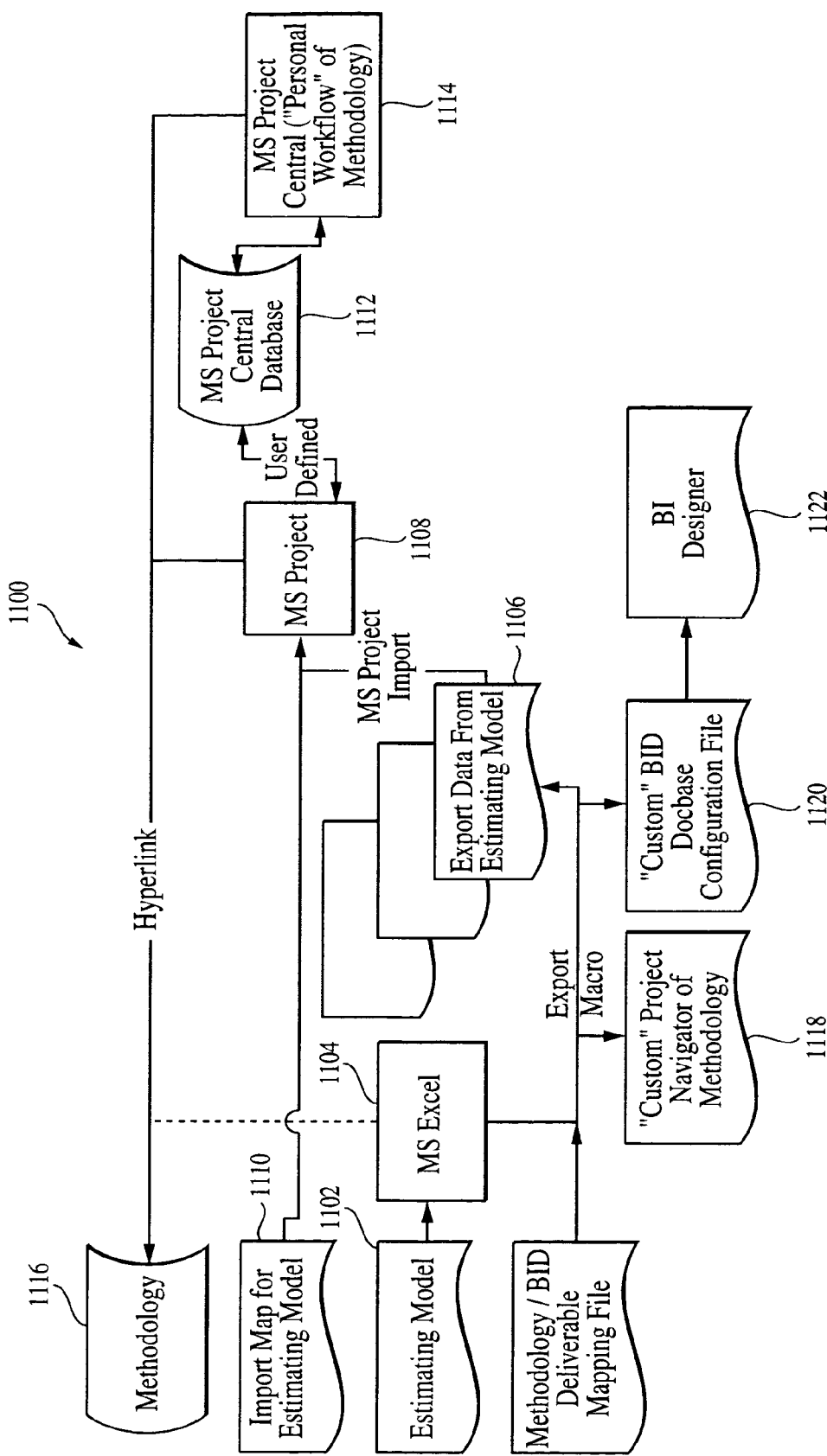
FIG. 11 depicts a schematic of the estimating tool project and work planning report generation system in accordance with the present invention.

Referring now to FIG. 11, a work planning schema 1100 is shown depicting the process flow details for using the Methodology Estimator 614 identified in FIG. 6. In overview of FIG. 11, the Methodology Estimator comprises an estimating model 1102 that may be a represented in spreadsheet and used with Microsoft Excel 1104. Within Excel, the scope of the project may be tailored and the project work estimated. The tailored data from the spreadsheet may be exported into a formatted file 1106, and then imported into Microsoft Project 1108 using an import map 1110 to generate a work plan according to the tailored scope of the project. Although Microsoft Project is preferred, the invention may use other applications to generate a report in other formats representing the work plan. The work plan may be stored in a central database 1112 of tailored work plans for access by other users. Also, the work plan may be maintained on a local workstation 1114 for local access by users.

A common underpinning of the spreadsheet and work planning documents is the hierarchical listing of the activities, task packages and tasks comprising the project scope. Moreover, the listings include hypertext links to the Methodology Standard Content descriptions 1116, so that users may readily access detailed content and sample deliverables in support of the project. The Methodology content may reside in the enterprise Methodology Repository 604 (FIG. 6), or may be in the form of a methodology hosted by a project.

Another feature of the work planning schema 1100 is the ability to generate custom project navigators 1118 of the methodology content based on the tailored scope of the estimate. These navigators provide a filtered list of hypertext links to the methodology for the project. Another feature is the ability to generate custom docbase configuration files 1120 that support a filtered list of project deliverables in a BI Designer web-base accessed document repository 1122.

Referring now in detail to the estimating model 1102, the model can be used in a variety of ways to aid the user in developing estimates and/or work planning documents. The estimator can be used in conjunction with the methodology, used as a stand-alone project estimator, or used as a base work plan generator. In the preferred embodiment, the estimating model is an Excel workbook with one embedded macro and supporting Visual Basic code. Preferably, the macro is coded in Visual Basic, but other programming languages are contemplated by the present invention for creating the macro. The macro and related Visual Basic Code provides the function that allows the user to export the estimate into other tools including Microsoft Project to create a base work plan. When the model is loaded into Excel, nine worksheets are visible: Instructions, Major Assumptions, Major Estimating Factors, Estimate, Estimating Factors, Complexity and Role Percentages. The Estimating Factors worksheets pulls data from the Major Estimating Factors worksheet. The Estimate worksheet pulls data from the Estimating Factors, Major Estimating Factors and Complexity worksheets. The Complexity worksheet pulls data from the Estimating Factors worksheet. The Role Percentage worksheet pulls data from the Estimate worksheet.

The Major Assumptions worksheet is used to document the main assumptions used in developing the estimate. Newly added project wide assumptions may be documented here, as are changes or data overrides.

The Major Estimating Factors are commonly used throughout the estimating model. The data entered in this worksheet are referenced by the corresponding factors in the Estimating Factors worksheet.

The Estimating Factors worksheet is used to store the number of units of each estimating factor to be used in the estimate. Some factors are based on the number of units of something within a project scope, such as number of screens or workstations. Some factors are driven by the calculated number of hours to deliver certain tasks.

The Complexity worksheet stores values associated with relative complexity of various aspects of the project. The values may represent simple, medium or complex states, or may require a numerical input based on a scale of 1 to 10, for example.

The Estimate worksheet is the main sheet of the estimator. A major feature of the worksheet is the listing of the standard task packages and tasks with hypertext links to the corresponding content web pages in the methodology repositories. The spreadsheets collect the estimating factors and complexity values for each task from the other worksheets relevant to determining an estimate for the time to perform a task or tasks. The spreadsheets also reports other calculated values such as tasks and task package total hours and man-days to complete the job, as well as project sub-totals for various phases and stages. Also, an inventory of key deliverables for each task is provided.

Another important feature of the Estimate worksheet is the listing of the task dependencies within their discipline, activities or task package. The primary purpose of this information is to set up the correct dependencies when the estimate information is exported to Microsoft Project. There are four types of dependencies that the estimating tool supports, which are the four standard dependencies that Microsoft Project supports. Therefore, if other project plan reporting software is used, the estimating tool should be modified to use the dependencies associated with the other plan reporting software. In this instance, the four dependencies are "Finish-to-Start" (task B cannot start until Task A finishes), "Start-to-Start" (task B cannot start until task A starts), "Finish-to-Finish" (task B cannot finish until task A finishes), and "Start-to-Finish" (task B cannot finish until task A starts). The user may modify the dependencies as part of the process of tailoring the estimate for the scope of the project.

Finally, the Role Percentage worksheet lists the default role mix by percentage for the execution of the task package. Thus, each task is defined by default as being completed by a percentage contribution from specific roles in the project. These defaults are based on experiences of prior projects. The information in this worksheet is leveraged when the estimate is exported to the project work plan software to generate role specific work plans with the estimate spread across the associated roles and tasks based on the percentages.

The Estimating tool may allow a user to tailor the specific instance of the model to the specific needs of a particular project, yet still retain its functionality. The Estimate worksheet contains by default all the standard task packages and their corresponding tasks for the methodology. Tasks and task packages may be deleted from the worksheet as being outside of the project scope. Preferably, the tasks that are "in scope" are so marked by including an "X" in the In Scope column. This X activates the information in the spreadsheet corresponding to the task or task package as being included for the calculation purposes and work plan generation purposes, while readily allowing a user to see what is not included. Alternatively, out-of-scope tasks may be deleted. Likewise, new tasks may be added to the worksheet, for example when additional reporting activity or additional tasks need to be added to a tasks package due to non-standard circumstances.

Similarly, Estimating Factors and Complexity Factors may be added or deleted from the worksheet. A role may also be added or deleted from the worksheet and the role percentage for specific tasks altered. In this manner, the Estimating model may be tailored by the user to arrive at a project scope in terms of not only the tasks to be completed, but also the personnel to perform the project, underlying estimating factors and sequence in which tasks will be completed.

As presently embodied, there is a two-step process to generate the work plan from the estimating spreadsheet. First, the spreadsheet is exported into several files, and then selective files are imported and mapped into a Microsoft Project file. First, Microsoft Project is set up by a mapping file 1102 that is downloaded from the Estimator page in the methodology repository. The mapping file 1102 is opened and copied into Microsoft Project to modify the global.mpt template. Then, the estimating workbook is exported from Excel. The macro is invoked to cause four export files to be created. A first file 1106 is created with three worksheets: a listing of all "in-scope" tasks and tasks packages, a listing of the division of work on a task and task package basis based on information from the role percentage worksheet, and a listing of the roles. A second file 1118 is created that include the customizable navigator page to the methodology containing all the "in-scope" task and task pages with the associated URL's to the corresponding methodology content web pages. A third file (not shown) is created that lists errors and exceptions found during export. A fourth file 1120 is created that contains the deliverable sample (i.e., template) names that correspond to the key deliverables for the "in-scope" tasks and task packages.

The next step is to import the first file 1106 into the Microsoft Project application. The values from the workbook are mapped into appropriate Microsoft Project fields according to the Import map 1110. This generates a work plan report in Microsoft Project that builds out timelines for each tasks according to the time estimates and the task dependency rules in the Estimating workbook. The work plan may be viewed according to the task hierarchy for the whole project, or may be viewed according to the series of tasks assigned to each role.

In addition, all the tasks and task packages are listed in the work plan with hypertext links to the underlying methodology documents supporting the tasks. The work plan also lists the key deliverables due for each task. To access the deliverable templates, a user clicks on the URL link for the task description to display up the methodology content description, which includes a hypertext link to the key deliverables for that task.

The deliverables may also be available through other means. The fourth file 1120 generated by exporting the Estimating spreadsheet is a custom docbase configuration file that may be used to build a customized document repository for the key deliverables. The docbase configuration file 1120 acts as a filter for the standard Methodology Deliverable Mapping File 1124 so that only the "in-scope" deliverables are uploaded through an installation feature into the BI Designer Documentum web-based published content repository for the project. Also, other means for making work plan specific deliverables accessible to users may be used.

While the invention has been described in conjunction with specific embodiments it is to be understood that many alternatives, modifications, and variations will be apparent to those skilled in the art in light of the foregoing detailed description. It is therefore intended that the foregoing description be regarded as illustrative rather than limiting, and that it be understood that it is the following claims, including all equivalents, that are intended to define the spirit and scope of this invention.

What is claimed is:

1. A method of populating a database, comprising:
   a) providing a plurality of information files, wherein each information file includes an object, each object including a type, an object property and an object explicit relationship;
   b) providing a plurality of rule files, wherein each rule file includes a relation between at least two object types, each relation including a relation property and an explicit relationship definition;
   c) validating the object properties and the object explicit relationships based in part on the relation properties, the explicit relationship definitions, or both;
   d) determining at least one implicit relationship based on at least one of the explicit relationship definitions and at least one of the object explicit relationships;
   e) generating at least one Structured Query Language (SQL) command representative of the at least one implicit relationship;
   f) executing the generated at least one SQL command on a database to store an implicit relationship definition in the form of a SQL statement;
   g) selecting an object from the information files; and
   h) generating a document by populating a presentation template with the object property of the selected object, the document having at least one hypertext link to a second document, the link based on the stored implicit relationship definition.

2. The method of claim 1 wherein the plurality of information files and the plurality of rule files are formatted in XML.

3. The method of claim 1 wherein at least one of the explicit relationship definitions is representative of a hierarchical relationship adapted to reference at least one second explicit relationship definition.

4. The method of claim 3, wherein validating further comprises traversing a hierarchy associated with the hierarchical relationship.

5. The method of claim 1, further comprising generating a SQL command based on at least one of the object explicit relationships.

6. The method of claim 1, wherein each object includes a type selected from the group consisting of activity, attachment, activity-operations, building-block, by-types, checklist, composite, custom-HTML, deliverable, external-asset, generic, job-aid, reference-material, role, linked-object-list, table-of-contents, task, transition-point, and methodology.

7. The method of claim 1, wherein each relation includes a type selected from the group consisting of attachment, checklist, container, contains, deliverable, deliverable checklist, deliverable, deliverable-checklist, deliverable-to-transition, external-reference, inventory-list, job-aid, next, participating-process, participating-role, previous, primary-deliverable, primary-input, process-checklist, process-job-aid, reference-material, related-process, related-topic, responsible-deliverables, responsible-processes, role-checklist, role-for-provisioning-team, role-for-receiving-team, role-job-aid, sample, secondary-deliverable, secondary-input, template, where-created, where-referenced, linked-object-list.

8. The method of claim 1, wherein the plurality of rules files is hierarchically ordered.

9. The method of claim 8, further comprising providing a primary root file associated with one methodology.

10. The method of claim 9, wherein the primary root file references a first secondary root file referencing a first hierarchical structure for defining all valid relationship types for the methodology, a second secondary root file referencing a second hierarchical structure for defining relationship definitions for the methodology, and a third secondary root file referencing a third hierarchical structure for defining rules associated with the relationship definitions.

11. A computer program embodied on a computer readable medium capable of populating a database, comprising:
   a) a code segment for retrieving a plurality of information files, wherein each information file includes an object, each object including a type, an object property and an object explicit relationship;
   b) a code segment for retrieving a plurality of rule files, wherein each rule file includes a relation between at least two object types, each relation including a relation property and an explicit relationship definition;
   c) a code segment for validating the object properties and the object explicit relationships based in part on the relation properties, the explicit relationship definitions, or both;
   d) a code segment for determining at least one implicit relationship based on at least one of the explicit relationship definitions and at least one of the object explicit relationships;
   e) a code segment for generating at least one Structured Query Language (SQL) command representative of the at least one implicit relationship;
   f) a code segment for executing the generated at least one SQL command on a database to store an implicit relationship definition in the form of a SQL statement;
   g) a code segment for selecting an object from the information files; and
   h) a code segment for generating a document by populating a presentation template with the object property of the selected object, the document having at least one hypertext link to a second document, the link based on the stored implicit relationship definition.

12. The computer program of claim 11, wherein at least one of the explicit relationship definitions is representative of a hierarchical relationship adapted to reference at least one second explicit relationship definition.

13. The computer program of claim 12, wherein validating further comprises traversing a hierarchy associated with the hierarchical relationship.

14. The computer program of claim 11, further comprising a code segment for generating a SQL command based on at least one of the object explicit relationships.

15. The method of claim 1, further comprising storing the at least one generated SQL command in at least one of the rules files.

16. The method of claim 1, wherein at least one object explicit relationship defines a relationship between two distinct objects.

17. The method of claim 16, wherein the validating the object explicit relationships includes determining whether the distinct objects are allowed to have the relationship defined in the object explicit relationship.

18. The method of claim 1, further comprising generating an inventory file that describes each object included in the information files.

19. The method of claim 1, further comprising generating a relationship database that includes each object explicit relationship included in the information files.

20. The method of claim 19, wherein the relationship database includes the at least one implicit relationship.

21. The computer program of claim 11, further comprising a code segment for storing the at least one generated SQL command in at least one of the rules files.

22. The computer program of claim 11, wherein at least one object explicit relationship defines a relationship between two distinct objects.

23. The computer program of claim 22, wherein validating the object explicit relationships includes determining whether the distinct objects are allowed to have the relationship defined in the object explicit relationship.

24. The computer program of claim 11, further comprising a code segment for generating an inventory file that describes each object included in the information files.

25. The computer program of claim 11, further comprising a code segment for generating a relationship database that includes each object explicit relationship included in the information files.

26. The computer program of claim 25, wherein the relationship database includes the at least one implicit relationship.

\* \* \* \* \*

UNITED STATES PATENT AND TRADEMARK OFFICE
CERTIFICATE OF CORRECTION

| | |
|---|---|
| PATENT NO. | : 8,019,793 B2 |
| APPLICATION NO. | : 10/367618 |
| DATED | : September 13, 2011 |
| INVENTOR(S) | : Christopher M. Fisher et al. |

It is certified that error appears in the above-identified patent and that said Letters Patent is hereby corrected as shown below:

Figure 10, in the box labeled 1004, after "ASPeMail" replace "componenet" with --component--.

Figure 10, in the box labeled 1010, after "Expandable/" replace "Collapsable" with --Collapsible--.

Column 3, line 7, after "FIG. 4 is" insert --a--.

Column 3, line 54, immediately after "containing an object type" insert --,--.

Column 4, line 45, before "should be appreciated" replace "In" with --It--.

Column 5, line 39, before "types can be" replace "relationships" with --relationship--.

Column 7, line 42, after "ObjectTypeWith" replace "Heirarchy" with --Hierarchy--.

Column 7, line 45, before "element 300" replace "RelationshipsHeirarchy" with --RelationshipsHierarchy--.

Column 8, line 36, after "well as", replace "ID Number," with --ID_Number--.

Column 13, line 34, after "and deliverables in" replace "a" with --an--.

Column 13, line 57, after "core methodology" replace "these" with --the--.

Column 16, line 30, after "that may be" replace "a represented in spreadsheet" with --represented in a spreadsheet--.

Column 17, line 9, before "pulls data from the" replace "worksheets" with --worksheet--.

Signed and Sealed this
Third Day of April, 2012

David J. Kappos
*Director of the United States Patent and Trademark Office*

CERTIFICATE OF CORRECTION (continued)
U.S. Pat. No. 8,019,793 B2

Column 17, line 42, before "other calculated values" replace "reports" with --report--.

Column 18, line 34, before "Microsoft Project is set" delete "First,".

Column 18, line 44, before "the customizable" replace "include" with --includes--.

Column 18, line 57, after "out timelines for each" replace "tasks" with --task--.

Column 20, claim 7, line 6, before "deliverable-to-transition," delete "deliverable, deliverable checklist,".

Column 21, claim 17, line 7, after "claim 16, wherein" delete "the".